US009245412B2

(12) United States Patent
Holsclaw et al.

(10) Patent No.: US 9,245,412 B2
(45) Date of Patent: Jan. 26, 2016

(54) GAMING SYSTEM AND METHOD PROVIDING A GAME HAVING A PLURALITY OF ACTIVATABLE AWARD INDICATORS

(71) Applicant: IGT, Las Vegas, NV (US)

(72) Inventors: Benjamin R. Holsclaw, Sparks, NV (US); Thomas J. Humphrey, Reno, NV (US); Bradford D. Brown, Sparks, NV (US)

(73) Assignee: IGT, Las Vegas, NV (US)

( * ) Notice: Subject to any disclaimer, the term of this patent is extended or adjusted under 35 U.S.C. 154(b) by 310 days.

(21) Appl. No.: 14/028,931

(22) Filed: Sep. 17, 2013

(65) Prior Publication Data

US 2015/0080109 A1 Mar. 19, 2015

(51) Int. Cl.
*A63F 13/00* (2014.01)
*G07F 17/32* (2006.01)

(52) U.S. Cl.
CPC ........ *G07F 17/3244* (2013.01); *G07F 17/3262* (2013.01)

(58) Field of Classification Search
CPC ............ G07F 17/3211; G07F 17/3213; G07F 17/3267
USPC ................................................ 463/16, 20, 25
See application file for complete search history.

(56) References Cited

U.S. PATENT DOCUMENTS 5,100,137 A 3/1992 Fulton et al.
5,167,413 A 12/1992 Fulton et al.
5,188,363 A 2/1993 Marnell et al.
5,251,897 A 10/1993 Fulton et al.
5,259,613 A 11/1993 Marnell
5,322,295 A 6/1994 Cabot et al.
5,332,219 A 7/1994 Marnell et al.
5,374,067 A 12/1994 Jones et al.
5,393,057 A 2/1995 Marnell et al.
5,411,257 A 5/1995 Fulton et al.
5,431,408 A 7/1995 Adams et al.
5,437,451 A 8/1995 Fulton et al.
5,531,448 A 7/1996 Moody et al.
5,636,842 A 6/1997 Cabot et al.
5,732,950 A 3/1998 Moody et al.
5,755,621 A 5/1998 Marks et al.
5,788,573 A 8/1998 Baerlocher et al.
(Continued)

FOREIGN PATENT DOCUMENTS

GB 2 201 821 9/1988

*Primary Examiner* — James S McClellan
(74) *Attorney, Agent, or Firm* — Neal, Gerber & Eisenberg LLP

(57) ABSTRACT

Various embodiments of the present disclosure provide a gaming system and method providing a game having a plurality of activatable award indicators. Generally, in various embodiments, the gaming system enables a player to play any of a plurality of different games, each of which is associated with a different activatable award indicator of an award generator that is associated with a plurality of awards. For each different game, when a particular award indicator activation event occurs during play of that game, the gaming system activates the award indicator associated with that game. When an award determination triggering event occurs, the gaming system indicates a different award of the award generator for each active award indicator and provides the indicated awards to the player. The gaming system of the present disclosure thus enables the player to activate different award indicators through play of different games.

20 Claims, 23 Drawing Sheets

(56) References Cited

U.S. PATENT DOCUMENTS 5,803,809 A 9/1998 Yoseloff
5,820,460 A 10/1998 Fulton et al.
5,823,873 A 10/1998 Moody et al.
5,823,874 A 10/1998 Adams et al.
5,833,536 A 11/1998 Davids et al.
5,833,537 A 11/1998 Barrie
5,848,932 A 12/1998 Adams et al.
5,882,259 A 3/1999 Holmes et al.
5,911,418 A 6/1999 Adams et al.
5,954,335 A 9/1999 Moody et al.
5,957,774 A 9/1999 Holmes et al.
6,007,066 A 12/1999 Moody et al.
6,062,979 A 5/2000 Inoue
6,098,985 A 8/2000 Moody et al.
6,162,121 A 12/2000 Morro et al.
6,176,781 B1 1/2001 Walker et al.
6,186,894 B1 2/2001 Mayeroff
6,193,235 B1 2/2001 Vancura et al.
6,196,547 B1 3/2001 Pascal et al.
6,224,483 B1 5/2001 Mayeroff
6,248,016 B1 6/2001 Walker et al.
6,257,979 B1 7/2001 Walker et al.
6,311,978 B1 11/2001 Moody
6,334,613 B1 1/2002 Yoseloff
6,398,645 B1 6/2002 Yoseloff
6,406,023 B1 6/2002 Rowe
6,419,578 B1 7/2002 Moody et al.
6,422,940 B1 7/2002 Walker et al.
6,461,241 B1 10/2002 Webb et al.
6,474,645 B2 11/2002 Tarantino
6,517,074 B1 2/2003 Moody et al.
6,523,829 B1 2/2003 Walker et al.
6,561,898 B2 5/2003 Moody
6,565,436 B1 5/2003 Baerlocher
6,568,680 B1 5/2003 Moody et al.
6,605,000 B2 8/2003 Adams
6,634,943 B1 10/2003 Baerlocher
6,652,377 B1 11/2003 Moody
6,663,489 B2 12/2003 Baerlocher
6,672,959 B2 1/2004 Moody et al.
6,726,427 B2 4/2004 Jarvis et al.
6,726,563 B1 4/2004 Baerlocher et al.
6,729,961 B1 5/2004 Millerschone
6,733,389 B2 5/2004 Webb et al.
6,780,111 B2 8/2004 Cannon et al.
6,786,819 B2 9/2004 Baerlocher et al.
6,793,577 B1 9/2004 Wilkins et al.
6,827,646 B2 12/2004 Adams
6,884,165 B2 4/2005 Baerlocher
6,890,255 B2 5/2005 Jarvis et al.
6,902,479 B1 * 6/2005 D'Avanzo ........................ 463/18
6,916,245 B1 7/2005 Vancura et al.
6,935,950 B2 8/2005 Tarantino
6,964,418 B2 11/2005 Moody
6,986,709 B2 1/2006 Hughs-Baird et al.
6,991,538 B2 1/2006 Cannon
6,994,624 B2 2/2006 Gold et al.
6,997,805 B2 2/2006 Vancura
7,056,207 B2 6/2006 Walker et al.
7,059,965 B2 6/2006 Jackson
7,066,814 B2 6/2006 Glavich et al.
7,137,628 B2 11/2006 Moody
7,144,321 B2 12/2006 Mayeroff
7,156,397 B2 1/2007 Moody et al.
7,156,734 B1 1/2007 Walker et al.
7,179,169 B2 2/2007 Beaulieu et al.
7,198,570 B2 4/2007 Rodgers et al.
7,201,655 B2 4/2007 Walker et al.
7,226,358 B2 6/2007 Miller et al.
7,247,092 B2 7/2007 Jarvis et al.
7,278,919 B2 10/2007 Souza et al.
7,297,057 B2 11/2007 Gerrard et al.
7,311,598 B2 12/2007 Kaminkow et al.
7,311,604 B2 12/2007 Kaminkow et al.
7,354,342 B2 4/2008 Paulsen et al.
7,354,344 B2 4/2008 Paulsen et al.
7,371,174 B2 5/2008 Baerlocher
7,399,226 B2 7/2008 Mishra
7,416,186 B2 8/2008 Walker et al.
7,419,162 B2 9/2008 Lancaster et al.
7,425,177 B2 9/2008 Rodgers et al.
7,427,236 B2 9/2008 Kaminkow et al.
7,431,649 B2 10/2008 Webb et al.
7,442,123 B2 10/2008 Brill et al.
7,488,251 B2 2/2009 Kaminkow
7,513,828 B2 4/2009 Nguyen et al.
7,524,243 B2 4/2009 Bansemer et al.
7,547,252 B2 6/2009 Peterson et al.
7,575,514 B2 8/2009 Cuddy et al.
7,591,723 B2 9/2009 Cregan et al.
7,597,618 B2 10/2009 Webb et al.
7,614,946 B2 11/2009 Nicely
7,618,316 B2 11/2009 Cole et al.
7,641,197 B2 1/2010 Jackson
7,658,672 B1 2/2010 Wolf et al.
7,674,172 B2 3/2010 Miltenberger et al.
7,674,180 B2 3/2010 Graham et al.
7,708,628 B2 5/2010 Baerlocher
7,708,630 B2 5/2010 Nicely
7,748,714 B2 7/2010 Nicely et al.
7,749,059 B2 7/2010 Tarantino
7,771,274 B2 8/2010 Walker et al.
7,780,520 B2 8/2010 Baerlocher
7,785,188 B2 8/2010 Cannon
7,789,755 B2 9/2010 Davis et al.
7,794,317 B2 9/2010 Kaminkow et al.
7,803,041 B2 9/2010 Gold et al.
7,803,043 B2 9/2010 Jackson
7,806,760 B2 10/2010 Baerlocher
7,815,500 B2 10/2010 Montross et al.
7,815,503 B2 10/2010 Walker et al.
7,837,545 B2 11/2010 Blair, Jr. et al.
7,850,171 B2 12/2010 Bontempo et al.
7,857,693 B1 12/2010 Johnson et al.
7,862,430 B2 1/2011 Baerlocher et al.
7,867,073 B2 1/2011 Walker et al.
7,867,080 B2 1/2011 Nicely et al.
7,871,323 B2 1/2011 Walker et al.
7,874,904 B2 1/2011 Randall
7,914,369 B2 3/2011 Walker et al.
7,914,373 B2 3/2011 Webb et al.
7,918,724 B2 4/2011 Walker et al.
7,985,133 B2 7/2011 Baerlocher et al.
7,993,191 B2 8/2011 Evans et al.
8,002,620 B2 8/2011 Nicely et al.
8,062,119 B2 11/2011 Stern et al.
8,083,578 B2 12/2011 Jackson
8,092,290 B2 1/2012 Darby
8,092,293 B2 1/2012 Richards et al.
8,092,302 B2 1/2012 Cuddy et al.
8,100,748 B2 1/2012 Montross et al.
8,100,754 B2 1/2012 Bigelow, Jr. et al.
8,123,604 B2 2/2012 Lancaster et al.
8,137,174 B2 3/2012 Nicely et al.
8,142,280 B2 3/2012 Walker et al.
8,152,630 B2 4/2012 Cohen
8,157,633 B2 4/2012 Kaminkow
8,177,616 B2 5/2012 Nicely
8,197,319 B2 6/2012 Nicely
8,210,944 B2 7/2012 Mead
8,216,039 B2 7/2012 Nicely et al.
8,221,214 B2 7/2012 Nicely
8,226,469 B2 7/2012 Pawloski et al.
8,231,454 B2 7/2012 Caputo
8,235,780 B2 8/2012 Nicely
8,262,448 B2 9/2012 Nicely et al.
8,262,458 B2 9/2012 Rodgers et al.
8,308,547 B2 11/2012 Walker et al.
8,328,614 B2 12/2012 Jones et al.
8,353,751 B2 1/2013 Bickley et al.
8,376,836 B2 2/2013 Baerlocher et al.
8,382,572 B2 2/2013 Hoffman et al.
8,398,473 B2 3/2013 Baerlocher et al.
8,408,984 B2 4/2013 Walker et al.

(56) References Cited

U.S. PATENT DOCUMENTS

| | | | | |
|---|---|---|---|---|
| 8,425,303 | B2 | 4/2013 | Kennedy et al. | |
| 8,434,764 | B2 | 5/2013 | Walker et al. | |
| 8,444,465 | B2 | 5/2013 | Macaulay | |
| 8,449,362 | B2 | 5/2013 | Jackson | |
| 8,449,363 | B2 | 5/2013 | Baerlocher et al. | |
| 8,475,253 | B1 | 7/2013 | Cole | |
| 2004/0005919 | A1 | 1/2004 | Walker et al. | |
| 2005/0059448 | A1 | 3/2005 | Sims et al. | |
| 2005/0070353 | A1 * | 3/2005 | Webb et al. | 463/16 |
| 2005/0075159 | A1 * | 4/2005 | Kaminkow et al. | 463/16 |
| 2006/0073884 | A1 | 4/2006 | Walker et al. | |
| 2006/0237905 | A1 | 10/2006 | Nicely et al. | |
| 2007/0275777 | A1 | 11/2007 | Walker et al. | |
| 2008/0004101 | A1 * | 1/2008 | Hein et al. | 463/20 |
| 2008/0076542 | A1 | 3/2008 | Iddings et al. | |
| 2008/0111309 | A1 | 5/2008 | Nicely et al. | |
| 2010/0004051 | A1 | 1/2010 | Walker et al. | |
| 2010/0081497 | A1 | 4/2010 | Wolf et al. | |
| 2010/0099480 | A1 | 4/2010 | Caputo | |
| 2010/0113122 | A1 | 5/2010 | Walker et al. | |
| 2010/0120484 | A1 | 5/2010 | Caputo et al. | |
| 2010/0137056 | A1 | 6/2010 | Hoffman et al. | |
| 2011/0003627 | A1 | 1/2011 | Nicely et al. | |
| 2011/0014963 | A1 | 1/2011 | Walker et al. | |
| 2011/0111818 | A1 | 5/2011 | Baerlocher | |
| 2012/0214580 | A1 | 8/2012 | Hoffman et al. | |
| 2013/0059638 | A1 | 3/2013 | Nicely | |
| 2013/0059647 | A1 | 3/2013 | Nicely | |
| 2013/0065669 | A1 | 3/2013 | Michaelson et al. | |
| 2013/0079123 | A1 | 3/2013 | Nicely et al. | |
| 2013/0084961 | A1 | 4/2013 | Radisich et al. | |
| 2013/0084962 | A1 | 4/2013 | Radisich et al. | |
| 2013/0084994 | A1 | 4/2013 | Farrar | |

* cited by examiner

| | 1 Credit | 2 Credits | 3 Credits | 4 Credits | 5 Credits |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR OF A KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE OF A KIND | 3 | 6 | 9 | 12 | 15 |
| TWO PAIR | 2 | 4 | 6 | 8 | 10 |
| JACKS OR BETTER | 1 | 2 | 3 | 4 | 5 |

1116,1118

1116,1118

| | 1 Credit | 2 Credits | 3 Credits | 4 Credits | 5 Credits |
|---|---|---|---|---|---|
| ROYAL FLUSH | 250 | 500 | 750 | 1000 | 4000 |
| STRAIGHT FLUSH | 50 | 100 | 150 | 200 | 250 |
| FOUR ACES W/ 2, 3, OR 4 | 400 | 800 | 1200 | 1600 | 2000 |
| FOUR 2, 3, OR 4 W/ A-4 | 160 | 320 | 480 | 640 | 800 |
| FOUR ACES | 160 | 320 | 480 | 640 | 800 |
| FOUR 2, 3, OR 4 | 80 | 160 | 240 | 320 | 400 |
| FOUR 5-K | 50 | 100 | 150 | 200 | 250 |
| FULL HOUSE | 10 | 20 | 30 | 40 | 50 |
| FLUSH | 6 | 12 | 18 | 24 | 30 |
| STRAIGHT FLUSH | 4 | 8 | 12 | 16 | 20 |
| THREE OF A KIND | 3 | 6 | 9 | 12 | 15 |
| TWO PAIR | 1 | 2 | 3 | 4 | 5 |
| JACKS OR BETTER | 1 | 2 | 3 | 4 | 5 |

GAMING SYSTEM AND METHOD PROVIDING A GAME HAVING A PLURALITY OF ACTIVATABLE AWARD INDICATORS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but at reserves all copyright rights whatsoever.

BACKGROUND

Gaming systems that provide players awards in primary or base game's are well known. The gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in larger awards being provided when they do occur.

For such known gaming systems an amount of a wager paced on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple time for a single play of the primary game. For instance, a gaming system configured to operate a slot game may have one or more paylines and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awaits provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game even before the player knows an amount of a bonus award won via the bonus game.

Various players continually seek out new and different variations to gaming systems. A continuing need thus exists for gaming systems and methods that provide new, exciting, and engaging games.

SUMMARY

Various embodiments of the present disclosure provide a gaming system and method providing a game having a plurality of activatable award indicators. Generally, in various embodiments, the gaming system enables a player to play any of a plurality of different games, each of which is associated with a different activatable award indicator of an award generator that is associated with a plurality of awards. For each different game, when a particular award indicator activation event occurs during play of that game, the gaming system activates the award indicator associated with that game. When an award determination triggering event occurs, the gaming system indicates a different award of the award generator for each active award indicator and provides the indicated awards to the player. The gaming system of the present disclosure thus enables the player to activate different award indicators through play of different games, which encourages play of different games and exposes the player to a variety of games that the player may not frequently play or that the player has not played at all.

More specifically, in operation of one embodiment, the gaming system initiates a gaming session for a player and displays an award generator including a plurality of award symbols. Each of the award symbols is associated with one of a plurality of different awards. The gaming system enables the player to play any of a plurality of different games. Each of the games is associated with: (i) a different one of a plurality of different activatable award indicators, and (ii) one of a plurality of different award indicator activation events. For each play of each of the games, if the award indicator activation event associated with that game occurs and the award indicator associated with that game is not active, the gaming system activates the award indicator associated with that game. Upon an occurrence of an award determination event, for each active award indicator, the gaming system indicates one of the award symbols and provides the award associated with that indicated award symbol to the player.

It should thus be appreciated that the gaming system and method of the present disclosure provide a new game to increase player enjoyment, entertainment, and excitement.

Additional features and advantages are described herein, and will be apparent from, the following Detailed Description and the Figures.

BRIEF DESCRIPTION THE FIGURES

FIG. 1 is a flowchart illustrating an example method of operating one embodiment of the gaming system of the present disclosure.

FIGS. 2A, 2B, 2C, 2D, 2E, 2F, 2G, 2H, 2I, 2J, 2K, 2L, 2M, 2N, 2O, 2P, 2Q, and 2R illustrate screen shots of one example embodiment of the gaming system of the present disclosure during a gaming session of a player.

DETAILED DESCRIPTION

Game Having a Plurality of Activatable Award Indicators

Various embodiments of the present disclosure provide a gaming system and method providing a game having a plurality of activatable award indicators. Generally, in various embodiments, the gaming system enables a player to play any of a plurality of different games, each of which is associated with a different activatable award indicator of an award generator that is associated with a plurality of awards. For each different game, when a particular award indicator activation event occurs during play of that game, the gaming system activates the award indicator associated with that game. When an award determination triggering event occurs, the gaming system indicates a different award of the award generator for each active award indicator and provides the indicated awards to the player. The gaming system of the present disclosure thus enables the player to activate different award indicators through play of different games, which encourages play of different games and exposes the player to a variety of games that the player may not frequently play or that the player has not played at all.

It should be appreciated that games may be considered different in any suitable manner or according to any suitable rule. In one embodiment, games of different types are considered different games and games of the same type are considered the same game. For instance, in one example embodiment, slot games (i.e., games of a first type) are considered different than video poker games (i.e., games of a second different type). In another embodiment, different variations of the same type of game are considered different games. For instance, in one example embodiment, Jacks or Better Poker (i.e., one variation of a particular type of game (video poker)) and Deuces Wild Poker (i.e., another variation of video poker) are considered different games. In another embodiment, games played at different denominations are considered different games. For instance, in one example embodiment, games played at a $0.01 denomination are considered different than games played at a $0.25 denomination. In another embodiment, games played at different bet levels or wager amounts are considered different games. For instance, in one example games played at a 1 credit bet level are considered different than games played at a 5 credit bet level.

Figure 1:
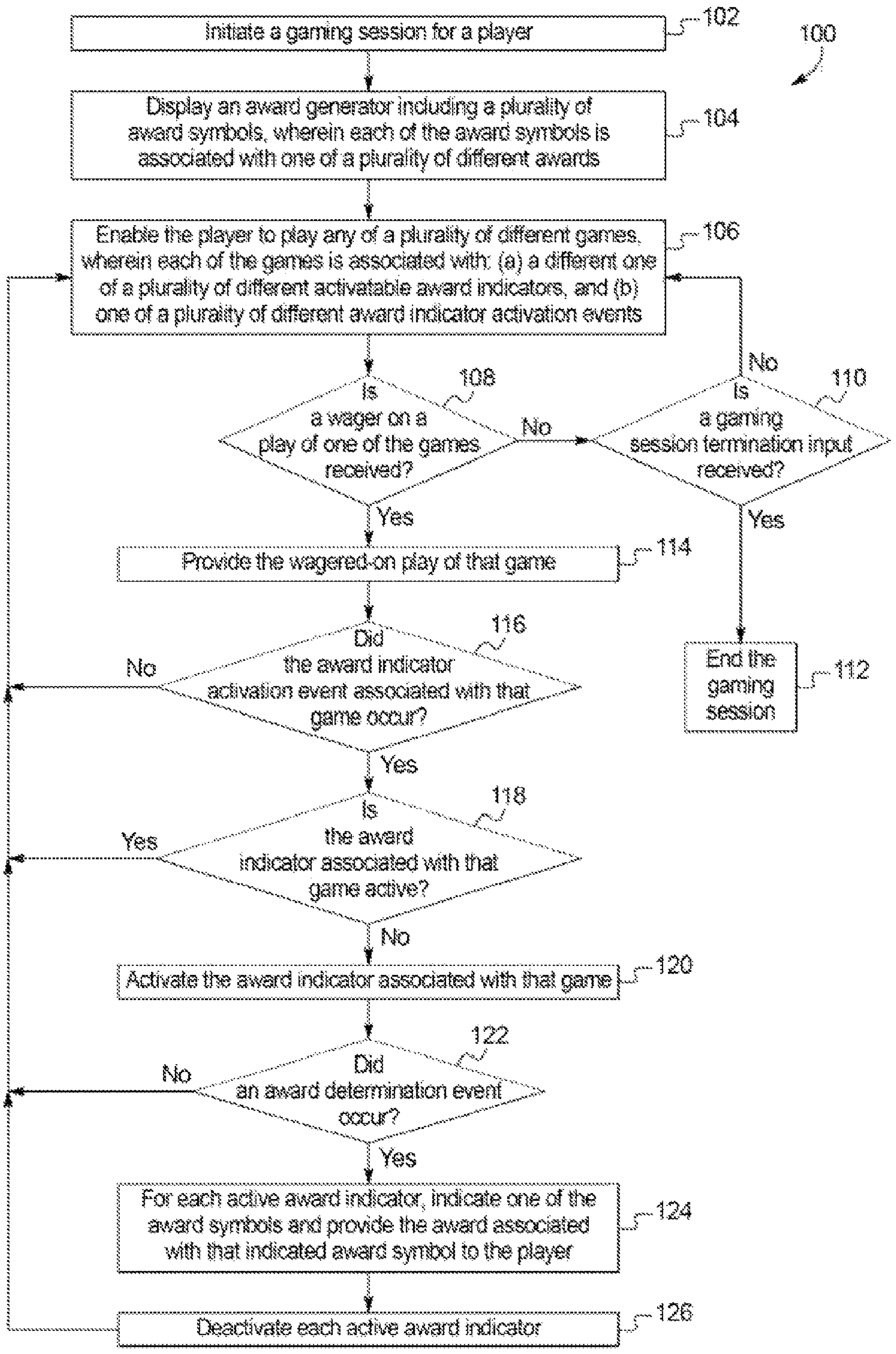

FIG. 1 illustrates a flowchart of an example process or method 100 of operating one embodiment of the gaming system of the present disclosure. In various embodiments, the process 100 is represented by a set of instructions stored in one or more memories and executed by one or more processors. Although the process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the gaming system initiates a gaming session for a player, as indicated by block 102. The gaming system displays an award generator including a plurality of award symbols, as indicated by block 104. Each of the award symbols is associated with one of a plurality of different awards. The gaming system readies the player to play any of a plurality of different games, as indicated by block 106. Each of the games is associated with: (a) a different one of a plurality of different activatable award indicators, and (b) one of a plurality of different award indicator activation events. The gaming system determines whether a wager on a play of one of the games was received, as indicated by diamond 108.

If the gaming system determines that a wager on a play of one of the games was not receive, the gaming system determines whether a gaming session termination input was received, as indicated by diamond 110. If the gaming system determines that the gaming session termination input was received, the gaming system ends the gaming session, as indicated by block 112. If, on the other hand, the gaming system determines that the gaming session termination input was not received, the process 100 returns to block 104.

Returning to diamond 108, if the gaming system determines that a wager on a play of one of the games was received, the gaming system provides the wagered-on play of that game, as indicated by block 114. The gaming system determines whether the award indicator activation event associated with that game occurred, as indicated by diamond 116. If the gaming system determines that the award indicator activation event associated with that game did not occur, the process 100 returns to block 106.

If, on the other hand, the gaming system determines that the award indicator activation event associated with that game occurred, the gaming system determines if the award indicator associated with that game is active, as indicated by diamond 118. If the gaming system determines that the award indicator associated with that game is active, the process 100 returns to block 106.

If, on the other hand, the gaming system determines that the award indicator associated with that game is not active, the gaming system activates the award indicator associated with that game, indicated by block 120. The gaming system determines if an award determination event occurred, as indicated by diamond 122. If the gaming system determines that the award determination event did not occur, the process 100 returns to block 106.

If, on the other hand, the gaming system determines that the award determination event occurred, for each active award indicator, the gaming system indicates one of the award symbols of the award generator and provides the award associated with that indicated award symbol to the player, as indicated by block 124. The gaming system deactivates each active award indicator, as indicated by block 126, and the process 100 returns to block 106.

FIGS. 2A, 2B, 2C, 2D, 2E, 2F, 2G, 2H, 2I, 2J, 2K, 2L, 2M, 2N, 2O, 2P, 2Q, and 2R illustrate screen shots of one example embodiment of the gaming system of the present disclosure during a gaming session of a player. In this example embodiment, the gaming system enables the player to play any of four different video poker games—Jacks or Better Poker, Deuces Wild Poker, Double Bonus Poker, and Double Double Bonus Poker—during the player's gaming session. Additionally, in this example embodiment, the video poker games are associated with a bonus or secondary game including a bonus wheel (i.e., the award generator in this example embodiment) including or displaying a plurality of award symbols each associated with one of a plurality of different awards.

Each of these video poker games is associated with a different activatable award indicator (which are pointers in this example embodiment) associated with the bonus wheel and one of a plurality of different award indicator activation events. In this example embodiment, each award indicator activation event is associated with a different one of a plurality of different ranges of poker hands, and a particular award indicator activation event occurs when, for a play the video poker game with which that award indicator activation event is associated, the final player hand is within the range of poker hands associated with that award indicator activation event. More specifically, in this example embodiment: (a) Jacks or Better Poker is associated with an award indicator activation event that occurs when the final player hand for a play of Jacks or Better Poker is a flush or better, (b) Deuces Wild Poker is associated with an award indicator activation event that occurs when the final player hand for a play of Deuces Wild Poker is a straight flush or better, (c) Double Bonus Poker is associated with an award indicator activation event that occurs when the final player hand for a play of Double Bonus Poker is a full house or better, and (d) Double Double Bonus Poker is associated with an award indicator activation event that occurs when the player hand for a play of Double Double Bonus Poker is a four-of-a-kind or better.

In this example embodiment, if the activatable award indicator associated with a particular video poker game is not active, the gaming system activates that award indicator when the final player hand for a play of that video poker game is within the range of poker hands associated with the award indicator activation event associated with that video poker game (i.e., when the award indicator activation event associated with that video poker game occurs). When each of the award indicators is active (i.e., when an award determination event occurs in this example embodiment), the gaming system spins and stops the bonus wheel such that each active award indicator indicates one of the award symbols. The gaming system provides the award(s) associated with the indicated award symbol(s) of the bonus wheel.

While any credit balances, any wagers, and any awards are displayed as amounts of monetary currency or credits in this example embodiment, one or more of such credit balances, such wagers, and such awards may be for any suitable non-monetary credits or currency, promotional credits, and/or player tracking points or credits.

Figure 2A:
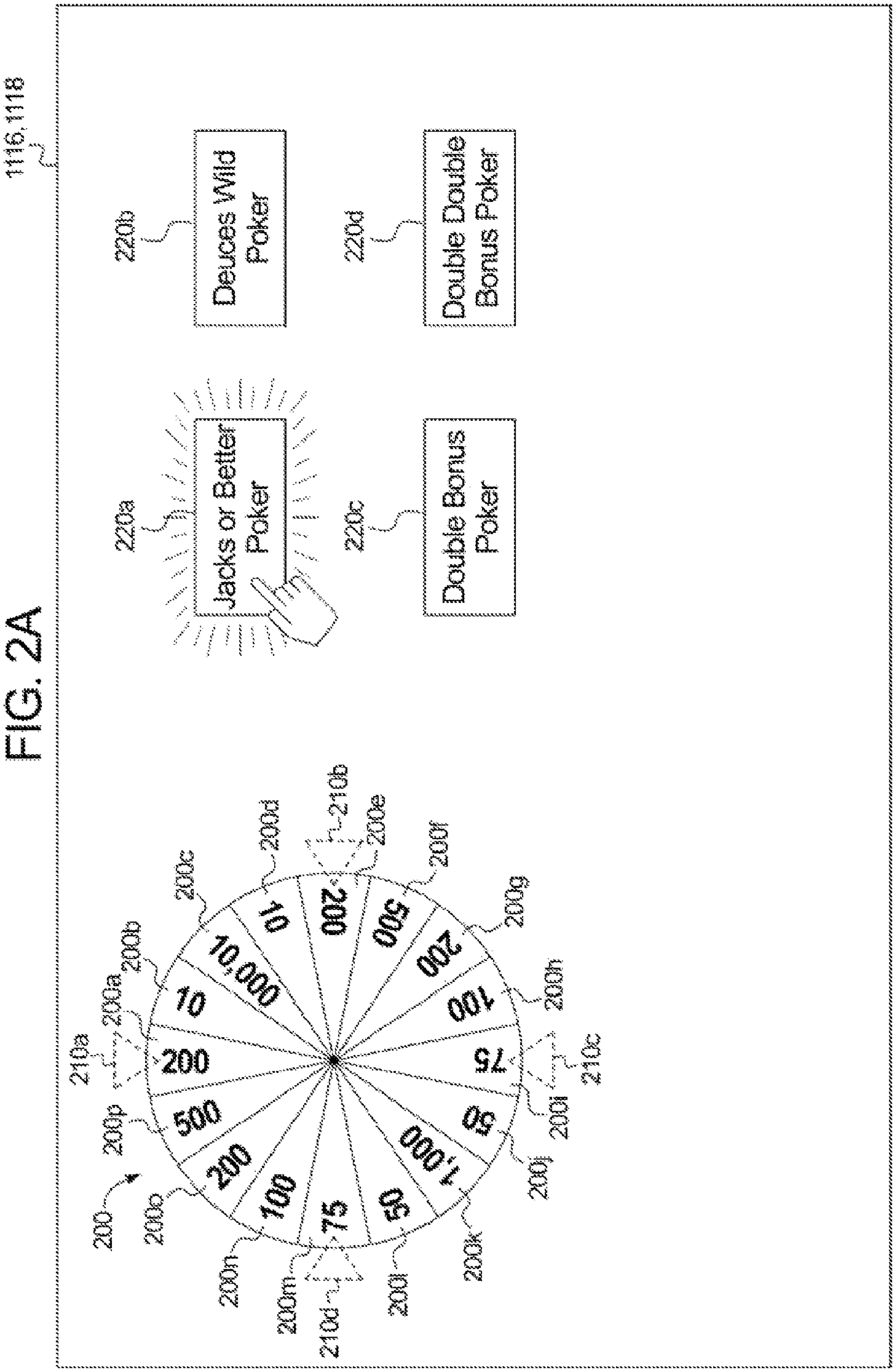

Turning to FIG. 2A, upon initiation of the gaming session in this example embodiment, the gaming system displays, such as on a display device 1116 or 1118 (described below), a game selection graphical user interface (GUI) that enables the player to select which video poker game to play. More specifically, the gaming system displays a plurality of virtual selectable buttons or icons 220*a*, 220*b*, 220*c*, and 220*d* that are respectively associated with Jacks or Better Poker, Deuces Wild Poker, Double Bonus Poker, and Double Double Bonus Poker. The gaming system enables the player to actuate one of the buttons 220*a*, 220*b*, 220*c*, and 220*d* to indicate which of the video poker games the player desires to play.

In this example embodiment, the gaming system also displays a bonus wheel 200 (i.e., an award generator). The bonus wheel 200 includes a plurality of sections 200*a*, 200*b*, 200*c*, 200*d*, 200*e*, 200*f*, 200*g*, 200*h*, 200*i*, 200*j*, 200*k*, 200*l*, 200*m*, 200*n*, 200*o*, and 200*p*. Each of the sections includes or displays one of a plurality of different award symbols, each of which is associated with one of a plurality of different awards. More specifically, in this example embodiment (a) the section 200*a* includes or displays an award symbol associated with an award of 200 credits, (b) the section 200*b* includes or displays an award symbol associated with an award of 10 credits, (c) the section 200*c* includes or displays an award symbol associated with an award of 10,000 credits, (d) the section 200*d* includes or displays an award symbol associated with an award of 10 credits, (e) the section 200*e* includes or displays an award symbol associated with an award of 200 credits, (f) the section 200*f* includes or displays an award symbol associated with an award of 500 credits, (g) the section 200*g* includes or displays an award symbol associated with an award of 200 credits, (h) the section 200*h* includes or displays an award symbol associated with an award of 100 credits, (i) the section 200*i* includes or displays an award symbol associated with an award of 75 credits, (j) the section 200*j* includes or displays an award symbol associated with an award of 50 credits, (k) the section 200*k* includes or displays an award symbol associated with an award of 1,000 credits, (l) the section 200*l* includes or displays an award symbol associated with an award of 50 credits, (m) the section 200*m* includes or displays an award symbol associated with an award of 75 credits, (n) the section 200*n* includes or displays an award symbol associated with an award of 100 credits, (o) the section 200*o* includes or displays an award symbol associated with an award of 200 credits, and (p) the section 200*p* includes or displays an award symbol associated with an award of 500 credits.

The gaming system also displays a plurality of different activatable award indicators 210*a*, 210*b*, 210*c*, and 210*d* in association with the bonus wheel 200. In this example embodiment, each of the award indicators is not active upon initiation of the player's gaming session. As noted above, each of the video poker games is associated with a different one of the award indicators. In this example embodiment: (a) Jacks or Better Poker is associated with the award indicator 210*a*, (b) Deuces Wild Poker is associated with the award indicator 210*b*, (c) Double Bonus Poker is associated with the award indicator 210*c*, and (d) Double Double Bonus Poker is associated with the award indicator 210*d*.

Figure 2B:
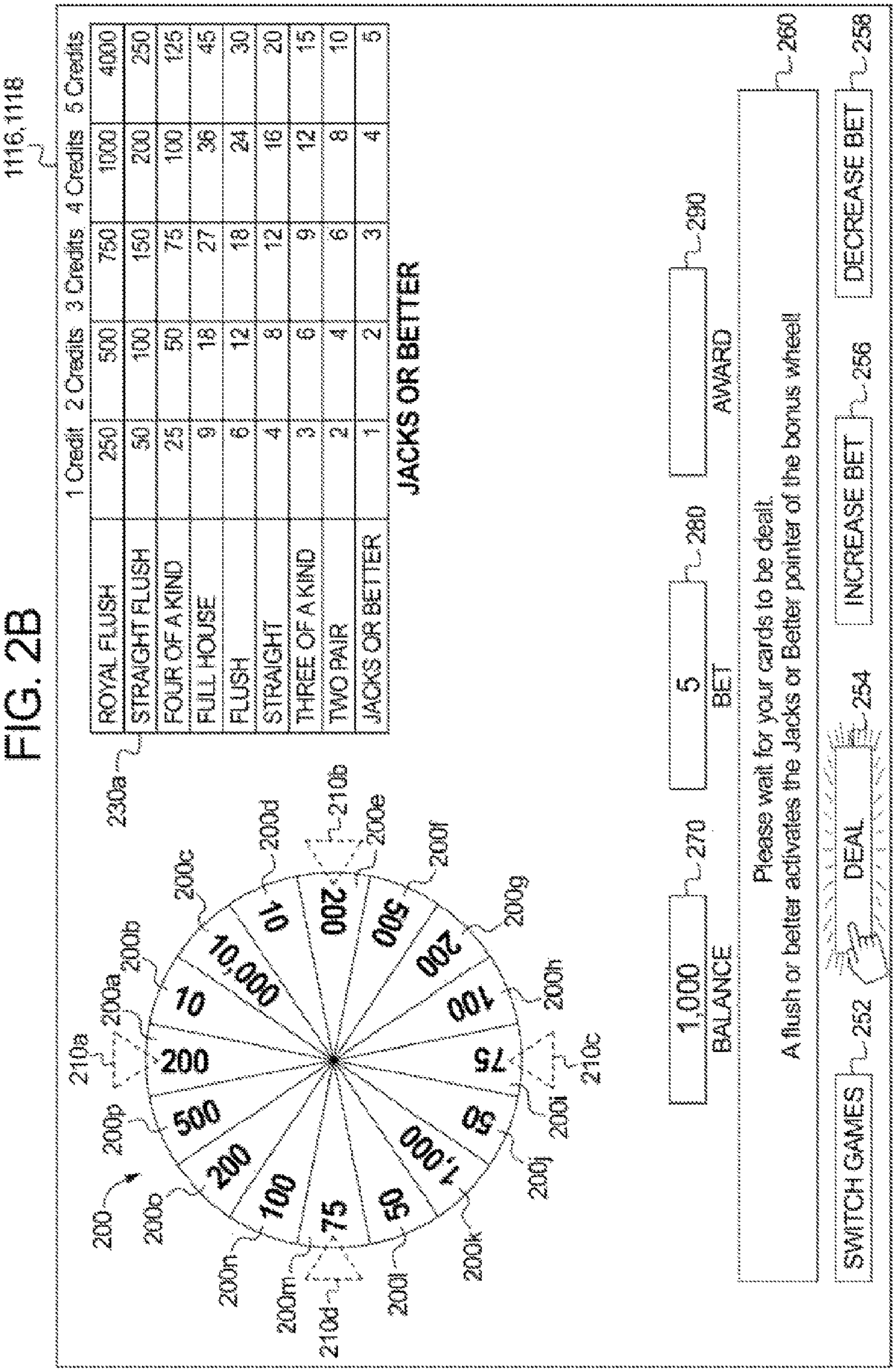

In this example embodiment, the gaming system receives an actuation of the button 220*a* associated with Jacks or Better Poker. As shown in FIG. 2B, after receiving the actuation of the button 220*a* associated with Jacks or Better Poker, the gaming system displays a GUI associated with Jacks or Better Poker that enables the player to play jacks or Better Poker. More specifically, the gaming system displays: (a) the bonus wheel 200; (b) a jacks or Better Poker payable 230*a*, which lists each winning poker hand and its associated award for wagers of 1 credit, 2 credits, 3 credits, 4 credits, and 5 credits; (c) a message box 260 in which the gaming system displays a variety of messages or indications before, during or after play of the video poker game; (d) a plurality of meters including: (i) a credit meter 270 in which the gaming system displays the player's credit balance (in credit or currency form), (ii) a bet or wager meter 280 that displays any wager placed on a play of the video poker game (in credit or currency form), and (iii) an award meter 290 that displays any awards won during play of the video poker game (in credit or currency form); and (e) a plurality of virtual selectable buttons that the gaming system enables the player to actuate, including: (i) a switch games button 252 that, when actuated by the player, causes the gaming system to enable the player to select a different one of the video poker games to play (ii) a deal button 254 that, when actuated by the player, causes the gaming system to either deal an initial player hand of cards or discard one or more non-held cards and replace the discarded cards with replacement cards; (iii) an increase bet button 256 that, when actuated by the player, causes the player's bet to increment by a designated amount (such as 1 credit); and (iv) a decrease bet button 258 that, when actuated by the player, causes the player's bet to decrement by a designated amount (such as 1 credit). While in this illustrated example the gaming system indicates the player's credit balance, any wagers, and any awards in the form of amounts of currency, it should be appreciated that such indications may alternatively or additionally be made in the form of amounts of credits.

The gaming system receives a wager of 5 credits from the player (as shown in the bet meter 280) and receives an actuation of the deal button 254. The gaming system displays the following message in the message box 260: "PLEASE WAIT FOR YOUR CARDS TO BE DEALT. A FLUSH OR BETTER ACTIVATES THE JACKS OR BETTER POINTER OF THE BONUS WHEEL!"

Figure 2C:
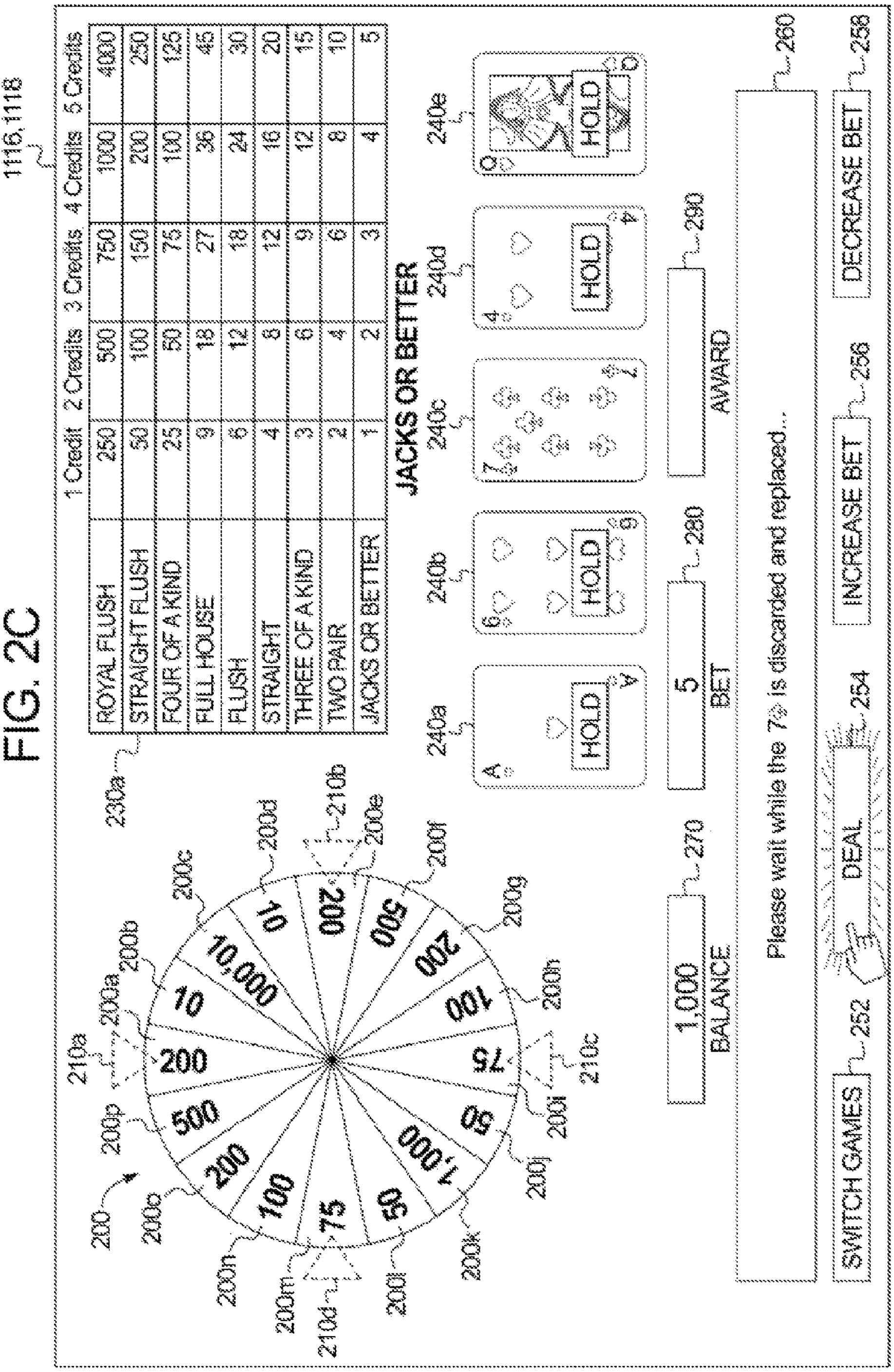

As illustrated in FIG. 2C, the gaming system determines and displays an initial player hand of cards including A♥ 240*a*, 6♥ 240*b*, 7♠ 240*c*, 4♥ 240*d*, and Q♥ 240*e*. The gaming system enables the player to select up to five of the cards of the initial player hand to hold and, in this example embodiment, receives an indication to hold the A♥ 240*a*, the 6♥ 240*b*, the 4♥ 240*d*, and the Q♥ 240*e*. The gaming system receives an actuation of the deal button 254. The gaming system displays the following message in the message box 260: "PLEASE WAIT WHILE THE 7♠ IS DISCARDED AND REPLACED . . . . "

Figure 2D:
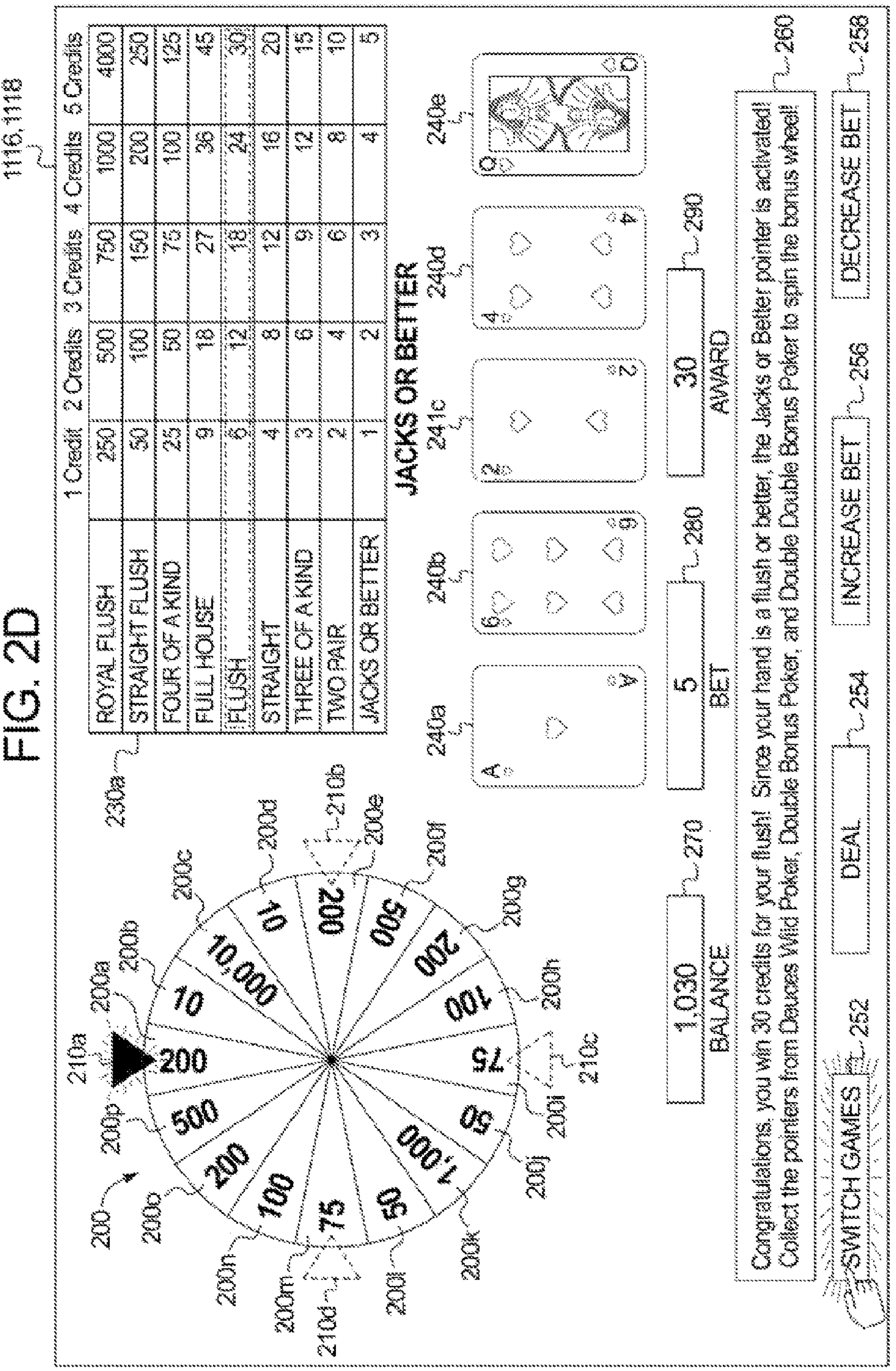

As illustrated in FIG. 2D, the gaming system discards the 7♠ 240*c* from the initial player hand, selects a replacement card 2♥ 241*c*, and adds the replacement card 2♥ 241*c* to the initial player hand to form a final player hand. That is, the gaming system replaces the discarded card 7♠ 240*c* with the replacement card 2♥ 241*c* to form the final player hand. The gaming system evaluates the final player hand A♥ 240*a*, 6♥ 240*b*, 2♥ 241*c*, 4♥ 240*d*, and Q♥ 240*e*, which is a flush, against the Jacks or Better Poker paytable 230*a* and determines an award of 30 credits associated with the final player hand. The gaming system displays the 30 credit award in the award meter 290 and updates the player's credit balance to reflect the 30 credit award.

Since the final player hand is a flush or better, the gaming system determines that the award indicator activation event associated with Jacks or Better Poker occurred in association with this play of Jacks or Better Poker. Since, at this point, the award indicator 210*a* associated with Jacks or Better Poker is not active, the gaming system activates the award indicator 210*a*. In this example embodiment, the gaming system displays an activation of the award indicator 210*a*. Since the all of the other three award indicators 210*b*, 210*c*, and 210*d* are not active, the gaming system determines that the award determination event did not occur. The gaming system displays the following message in the message box 260: "CONGRATULATIONS, YOU WIN 30 CREDITS FOR YOUR FLUSH! SINCE YOUR HAND IS A FLUSH OR BETTER, THE JACKS OR BETTER POINTER IS ACTIVATED! COLLECT THE POINTERS FROM DEUCES WILD POKER, DOUBLE BONUS POKER, AND DOUBLE DOUBLE BONUS POKER TO SPIN THE BONUS WHEEL!"

Figure 2E:
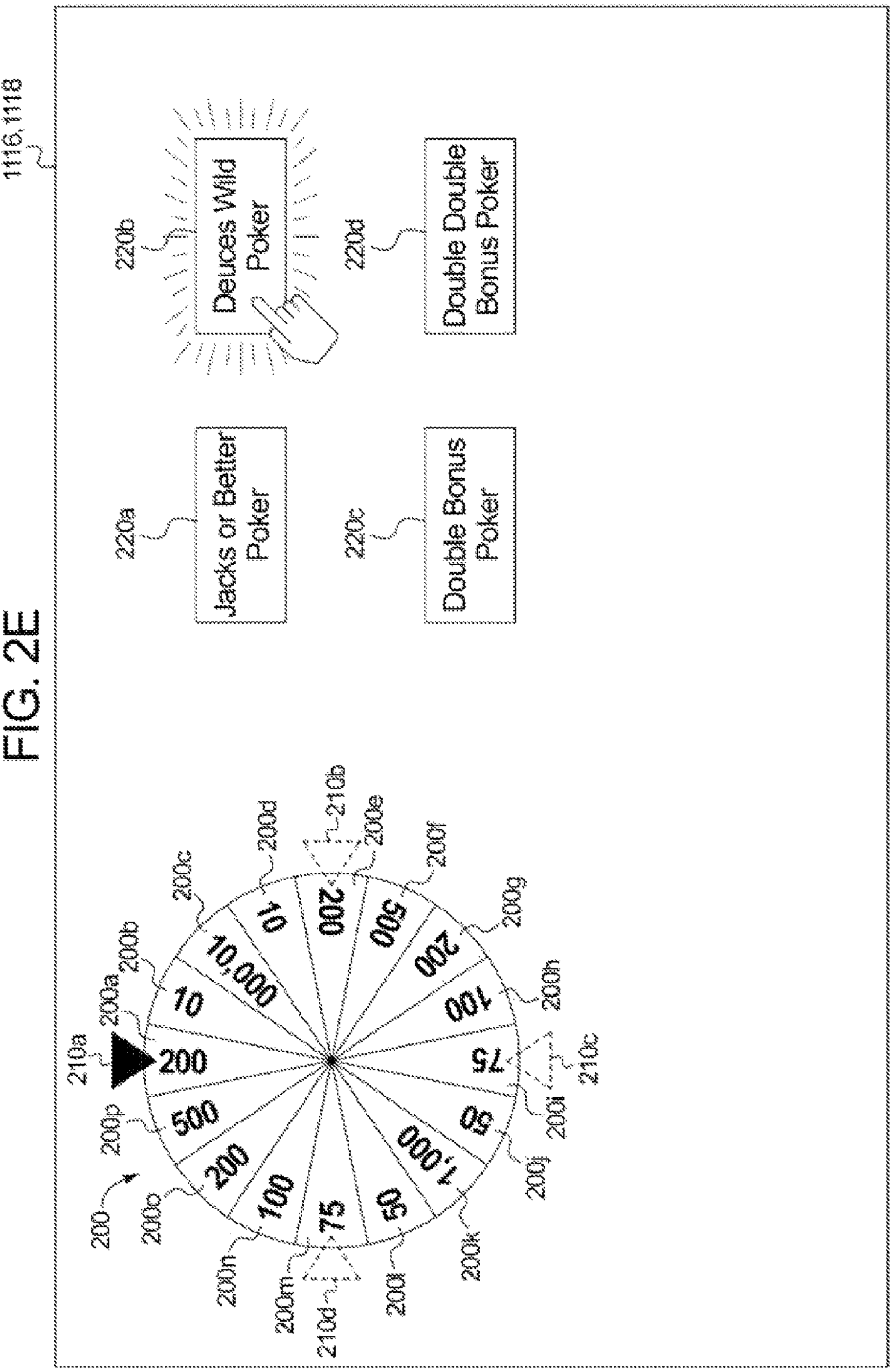

As also shown in FIG. 2D, the gaming system receives an actuation of the switch games button 252 from the player. Accordingly, as shown in FIG. 2E, the gaming system displays the game selection GUI and again enables the player to actuate one of the buttons 220*a*, 220*b*, 220*c*, 220*d* to indicate which of the video poker games the player desires to play. The gaming system receives an actuation of the button 220*b* associated with Deuces Wild Poker.

Figure 2F:
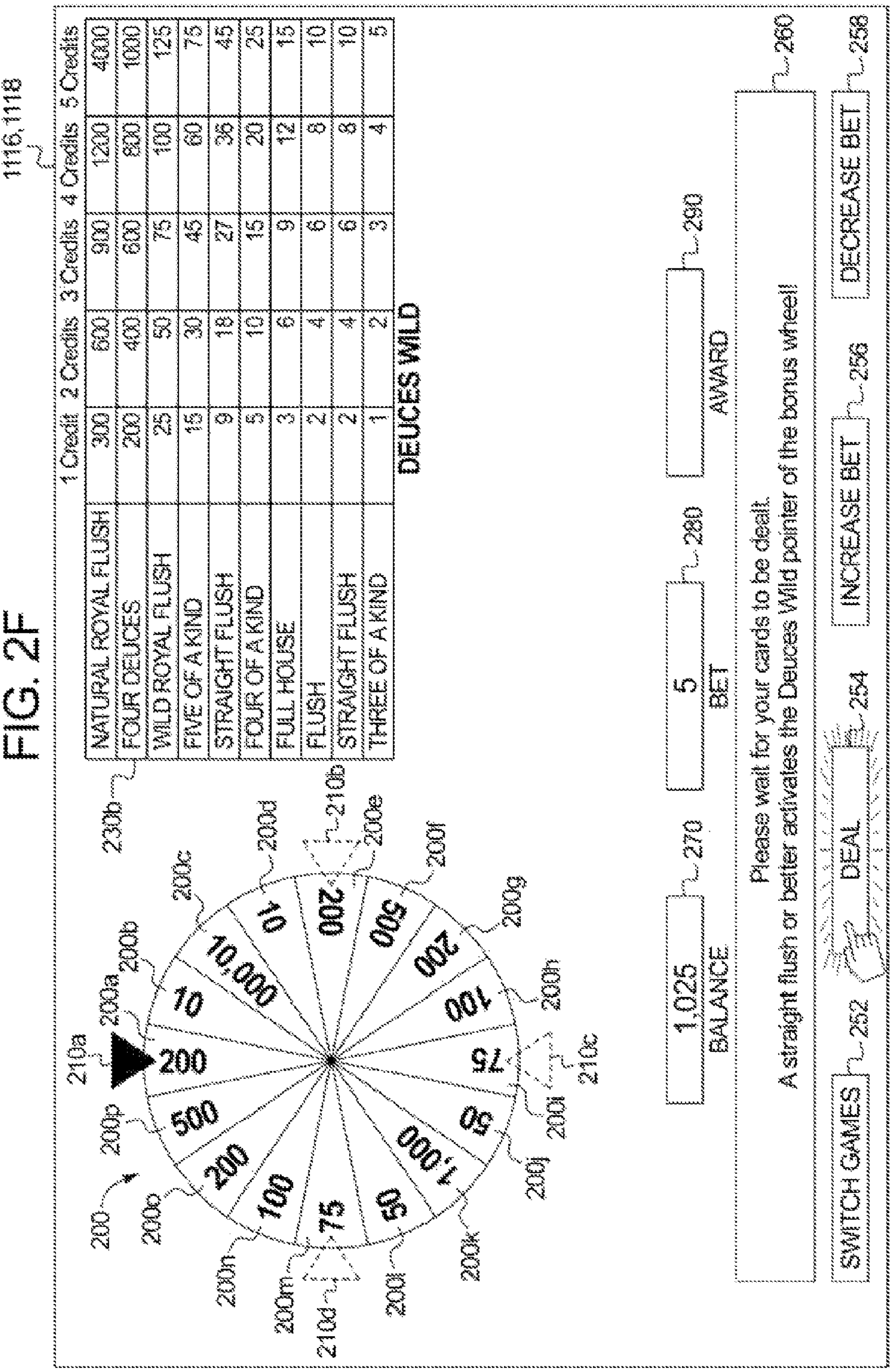

As shown in FIG. 2F, after receiving the actuation of the button 220*b* associated with Deuces Wild Poker, the gaming system displays a GUI associated with Deuces Wild Poker that enables the player to play Deuces Wild Poker. More specifically, the gaming system displays: (a) the bonus wheel 200; (b) a Deuces Wild Poker payable 230*b*, which lists each winning poker hand and its associated award for wagers of 1 credit, 2 credits, 3 credits, 4 credits, and 5 credits; (c) the message box 260 (described above); (d) a plurality of meters including: (i) the credit meter 270 (described above), (ii) the bet or wager meter 280 (described above), and (iii) the award meter 290 (described above); and (e) a plurality of virtual selectable buttons that the gaming system enables the player to actuate, including: (i) the switch games button 252 (described above); (ii) the deal button 254 (described above); (iii) the increase bet button 256 (described above); and (iv) the decrease bet button 258 (described above).

The gaming system receives a wager of 5 credits from the player (as shown in the bet meter 280) and receives an actuation of the deal button 254. The gaming system displays the following message in the message box 260: "PLEASE WAIT FOR YOUR CARDS TO BE DEALT. A STRAIGHT FLUSH OR BETTER ACTIVATES THE DEUCES WILD POINTER OF THE BONUS WHEEL!"

Figure 2G:
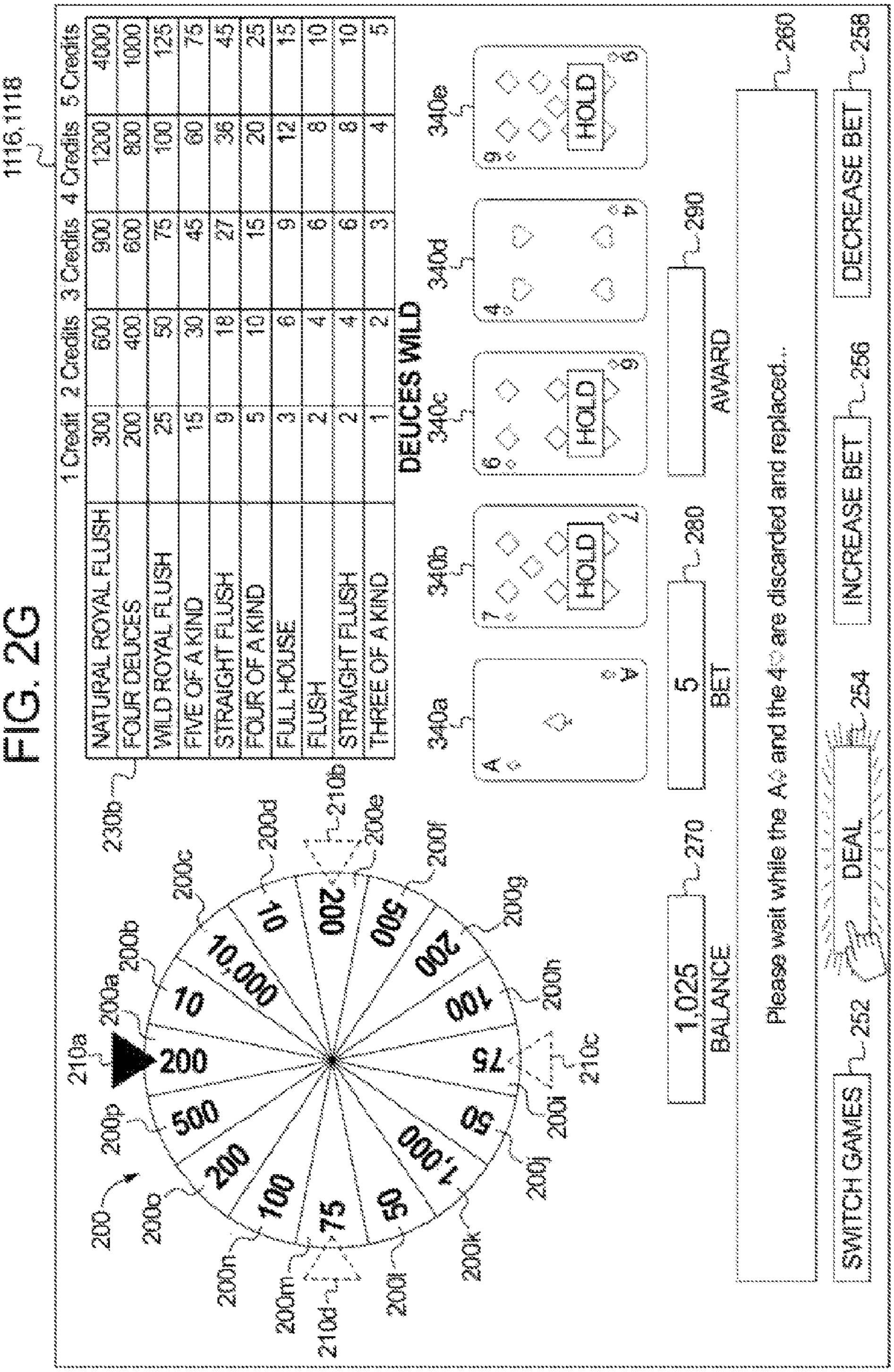

As illustrated in FIG. 2G, the gaming system determines and displays an initial player hand of cards inducing: A♠ 340*a*, 7♦ 340*b*, 6♦ 340*c*, 4♥ 340*d*, and 9♦ 340*e*. The gaming system enables the player to select up to five of the cards of the initial player hand to hold and, in this example embodiment, receives an indication to hold the 7♦ 340*b*, the 6♦ 340*c*, and the 9♦ 340*e*. The gaming system receives an actuation of the deal button 254. The gaming system displays the following message in the message box 260'. "PLEASE WAIT WHILE THE A♠ AND THE 4♥ ARE DISCARDED AND REPLACED . . . . "

Figure 2H:
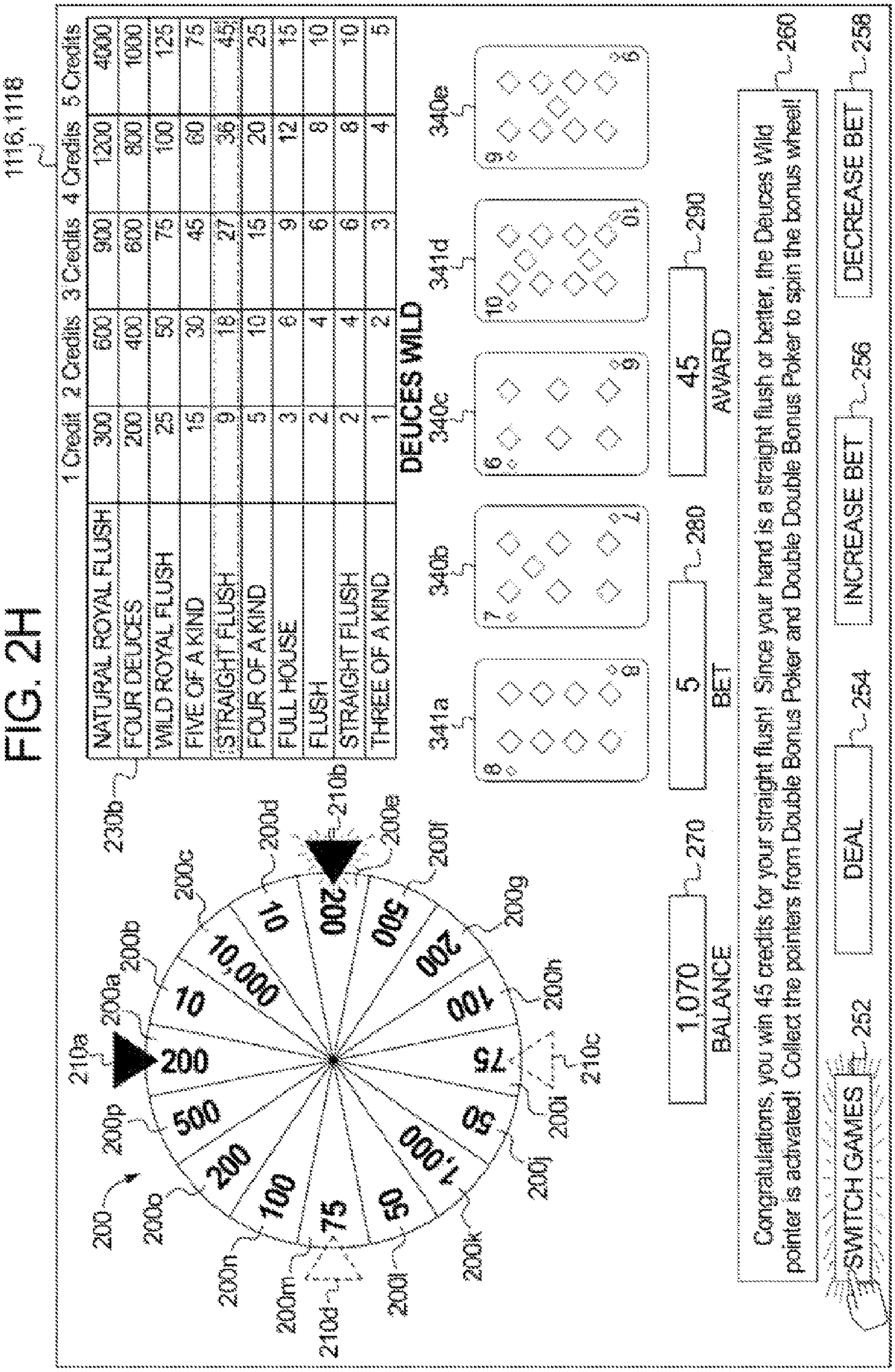

As illustrated in FIG. 2H, the gaming system discards the A♠ 340*a* and the 4♥ 340*d* from the initial player hand, selects replacement cards 8♦ 341*a* and 10♦ 341*d*, and adds the replacement cards 8♦ 341*a* and 10♦ 341*d* to the initial player hand to form a final player hand. That is, the gaming system replaces the discarded cards A♠ 340*a* and 4♥ 340*d* with the replacement cards 8♦ 341*a* and 10♦ 341*d* to form the final player hand. The gaming system evaluates the final player hand 8♦ 341*a*, 7♦ 340*b*, 6♦ 340*c*, 10♦ 341*d*, and 9♦ 340*e*, which is a straight flush, against the Deuces Wild Poker paytable 230*b* and determines an award of 45 credits associated with the final player hand. The gaming system displays the 45 credit award in the award meter 290 and updates the player's credit balance to reflect the 45 credit award.

Since the final player hand is a straight flush or better, the gaming system determines that the award indicator activation event associated with Deuces Wild Poker occurred in association with this play of Deuces Wild Poker. Since, at this point, the award indicator 210*b* associated with Deuces Wild Poker is not active, the gaming system activates the award indicator 210*b*. In this example embodiment, the gaming system displays an activation of the award indicator 210*b*. Since two of the other award indicators (i.e., award indicators 210*c* and 210*d*) are not active, the gaming system determines that the award determination event did not occur. The gaming system displays the following message in the message box 260: "CONGRATULATIONS, YOU WIN 45 CREDITS FOR YOUR STRAIGHT FLUSH SINCE YOUR HAND IS A STRAIGHT FLUSH OR BETTER, THE DEUCES WILD POINTER IS ACTIVATED! COLLECT THE POINTERS FROM DOUBLE BONUS POKER AND DOUBLE DOUBLE BONUS POKER TO SPIN THE BONUS WHEEL!"

Figure 2I:
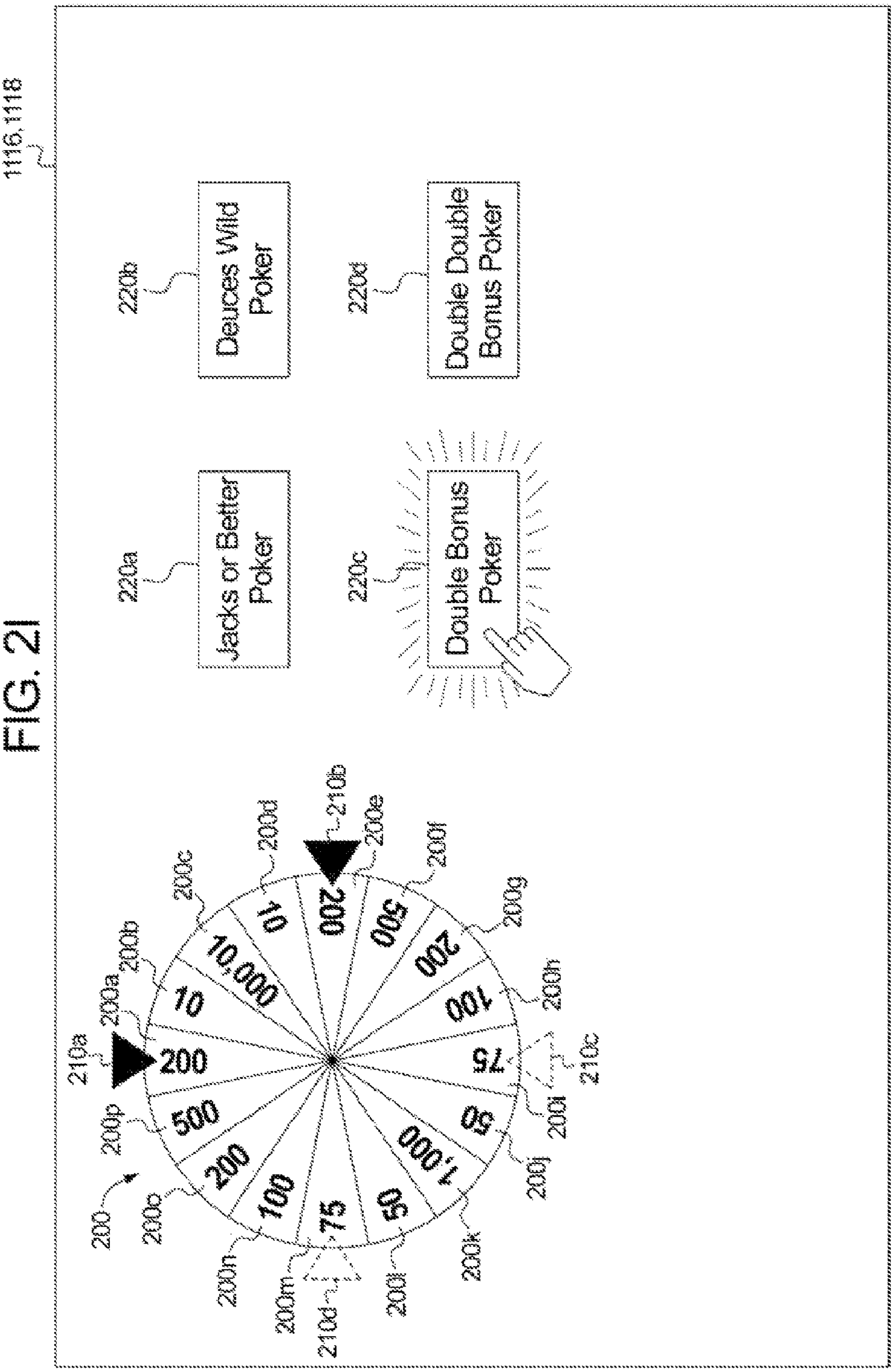

As also shown in FIG. 2H, the gaming system receives an actuation of the switch games button 252 from the player. Accordingly, as shown in FIG. 2I, the gaming system displays the game selection GUI and again enables the player to actuate one of the buttons 220*a*, 220*b*, 220*c*, 220*d* to indicate which of the video poker games the player desires to play. The gaming system receives an actuation of the button 220*c* associated with Double Bonus Poker.

Figure 2J:
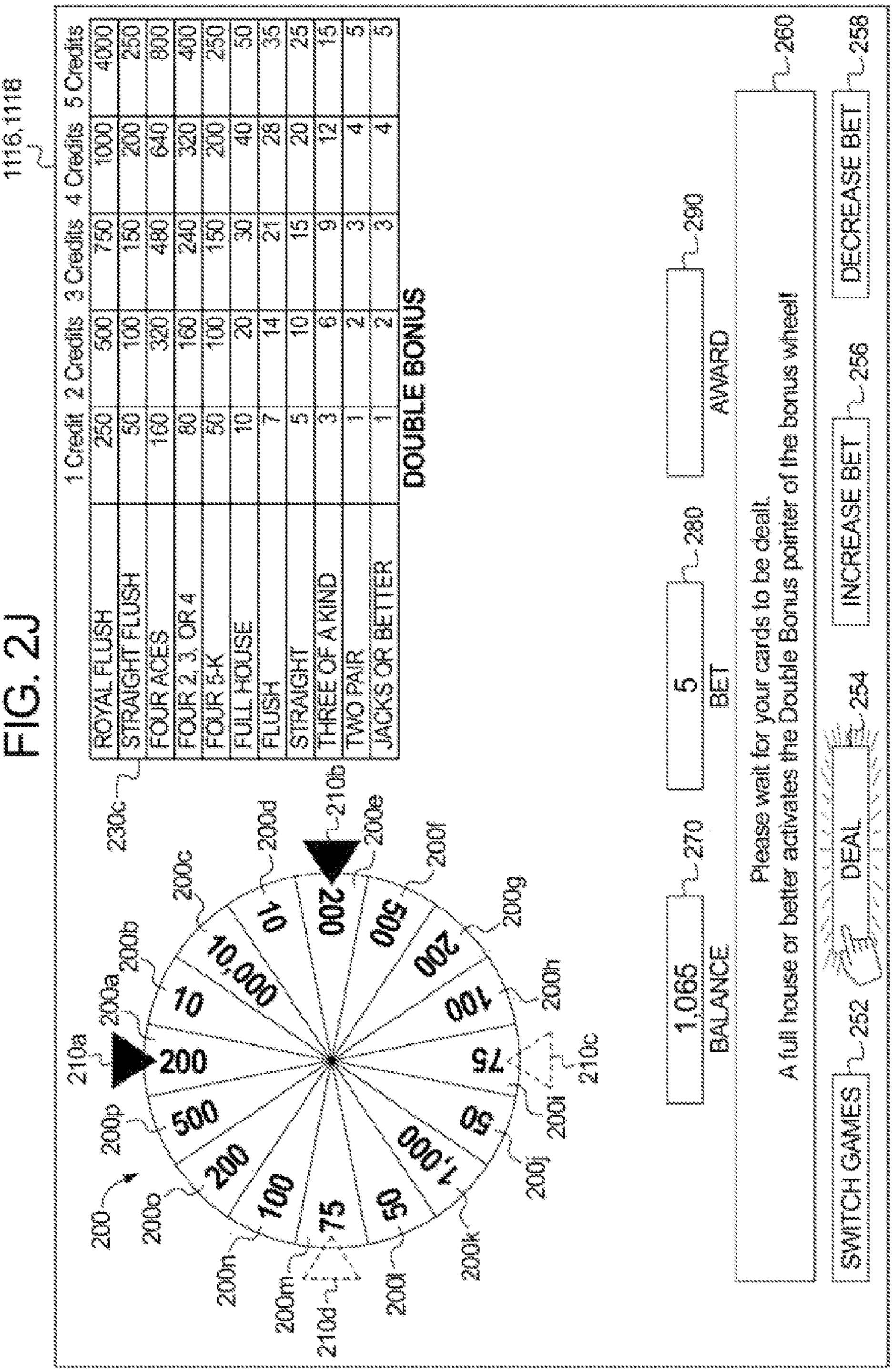

As shown in FIG. 2J, after receiving the actuation of the button 220*c* associated with Double Bonus Poker, the gaming system displays a GUI associated with Double Bonus Poker that enables the player to play Double Bonus Poker. More specifically, the gaming system displays: (a) the bonus wheel 200; (b) a Double Bonus Poker paytable 230*c*, which lists each winning poker hand and its associated award for wagers of 1 credit, 2 credits, 3 credits, 4 credits, and 5 credits; (c) the message box 260 (described above); (d) a plurality of meters including: (i) the credit meter 270 (described above), (ii) the bet or wager meter 280 (described above), and (iii) the award meter 290 (described above); and (e) a plurality of virtual selectable buttons that the gaming system enables the player to actuate, including: (i) the switch games button 252 (described above); (ii) the deal button 254 (described above); (iii) the increase bet button 256 (described above); and (iv) the decrease bet button 258 (described above).

The gaming system receives a wager of 5 credits from the player (as shown in the bet meter 280) and receives an actuation of the deal button 254. The gaming system displays the following message in the message box 260: "PLEASE WAIT FOR YOUR CARDS TO BE DEALT. A FULL HOUSE OR BETTER ACTIVATES THE DOUBLE BONUS POINTER OF THE BONUS WHEEL!"

Figure 2K:
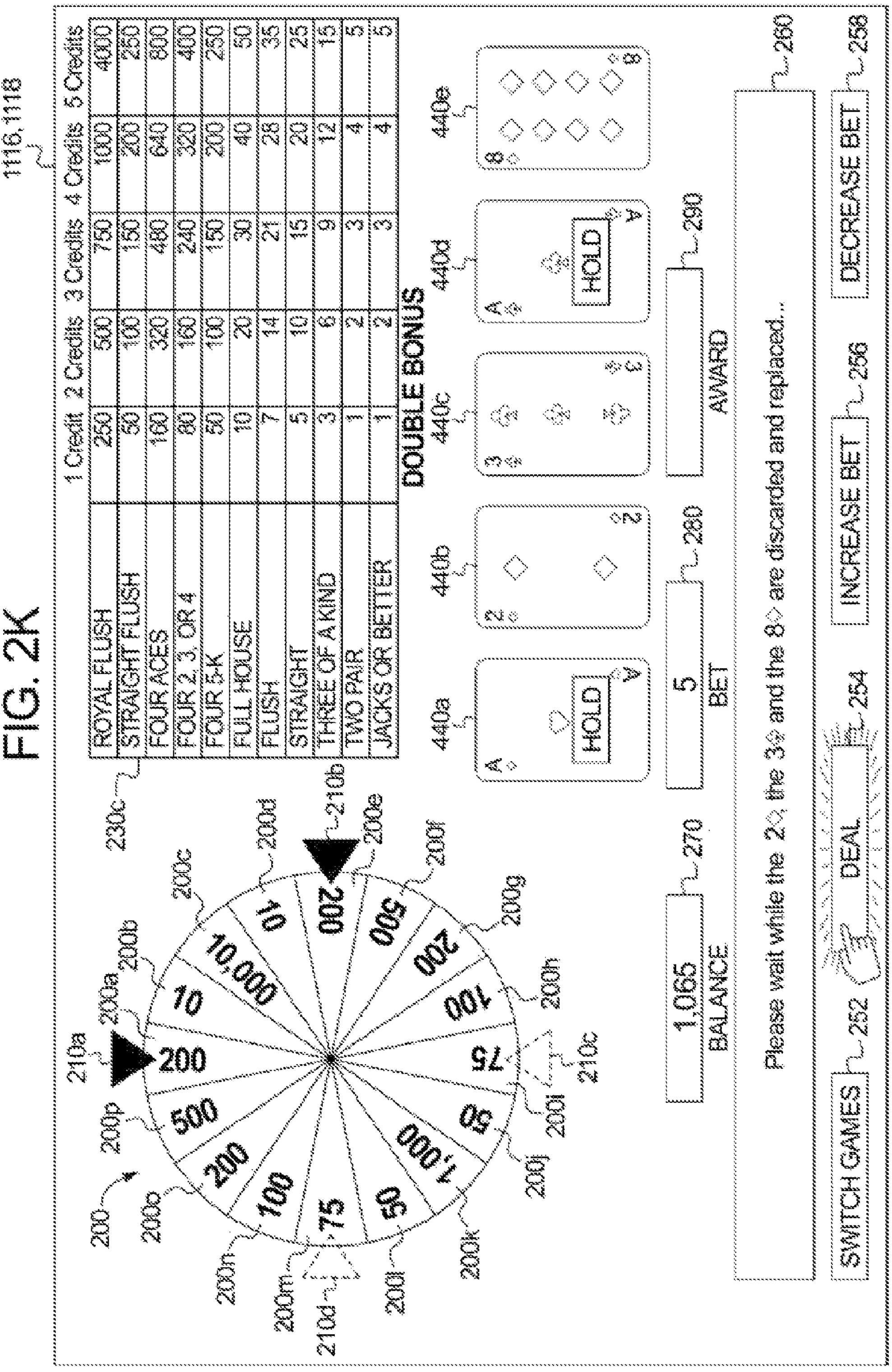

As illustrated in FIG. 2K, the gaming system determines and displays an initial player hand of cards including: A♥ 440*a*, 2♦ 440*b*, 3♣ 440*c*, A♣ 440*d*, and 8♦ 440*e*. The gaming system enables the player to select up to five of the cards of the initial player hand to hold and, in this example embodiment, receives an indication to hold the A♦ 440*a* and the A ♣ 440*d*. The gaming system receives an actuation of the deal button 254. The gaming system displays the following message in the message box 260: "PLEASE WAIT WHILE THE 2♦, THE 3♣, AND THE 8♦ ARE DISCARDED AND REPLACED . . . . "

Figure 2L:
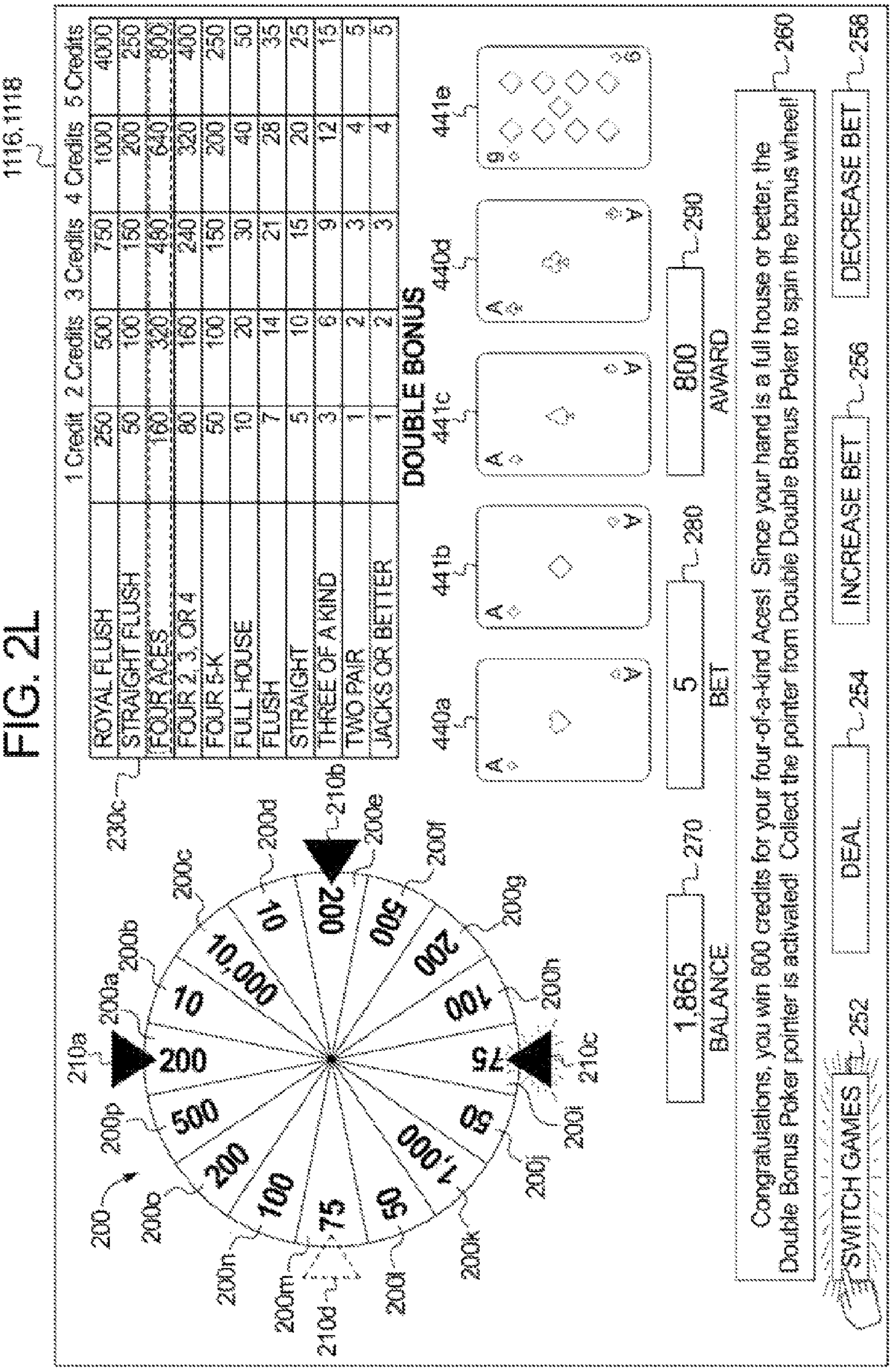

As illustrated in FIG. 2L, the gaming system discards the 2♦ 440*b*, the 3♣ 440*c*, and the 8♦ 440*e* from the initial player hand, selects replacement cards A♦ 441*b*, A♠ 441*c*, and 9♦ 441*e*, and adds the replacement cards A♦ 441*b*, A ♠ 441*c*, and 9♦ 441*e* to the initial player hand to form a final player hand. That is, the gaming system replaces the discarded cards 2♦ 440*b*, 3♣ 440*c*, and 8♦ 440*e* with the replacement cards A♦ 441*b*, A♠ 441*c*, and 9♦ 441*e* to form the final player hand. The gaming system evaluates the final player hand A♥ 440*a*, A♦ 441*b*, A♠ 441*c*, A♠ 440*d*, and 9♦ 441*e*, which is a four-of-a-kind of Aces, against the Double Bonus Poker payable 230*c* and determines an award of 800 credits associated with the final player hand. The gaming system displays the 800 credit award in the award meter 290 and updates the player's credit balance to reflect the 800 credit award.

Since the final player hand is a full house or better, the gaming system determines that the award indicator activation event associated with Double Bonus Poker occurred in association with this play of Double Bonus Poker. Since, at this point, the award indicator 210*c* associated with Double Bonus Poker is not active the gaming system activates the award indicator 210*c*. In this example embodiment, the gaming system displays an activation of the award indicator 210*c*. Since one of the remaining award indicators (i.e., the award indicator 210*d*) is not active, the gaming system determines that the award determination event did not occur. The gaming system displays the following message in the message box 260: "CONGRATULATIONS, YOU WIN 800 CREDITS FOR YOUR FOUR-OF-A-KIND ACES! SINCE YOUR HAND IS A FULL HOUSE OR BETTER, THE DOUBLE BONUS POINTER IS ACTIVATED! COLLECT THE POINTER FROM DOUBLE DOUBLE BONUS POKER TO SPIN THE BONUS WHEEL!"

Figure 2M:
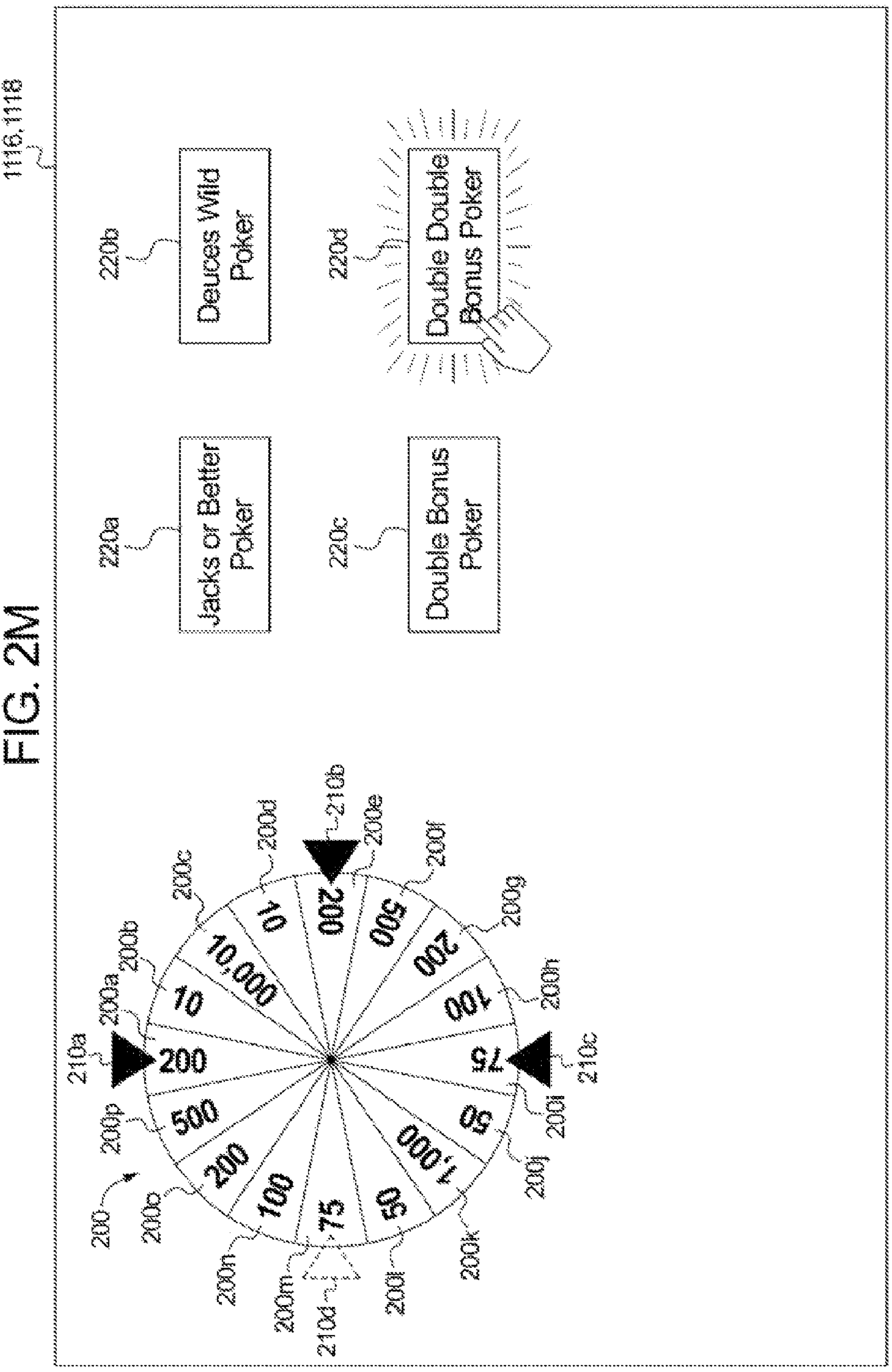

As also shown in FIG. 2L, the gaming system receives an actuation of the switch games button 252 from the player. Accordingly, as shown in FIG. 2M, the gaming system displays the game selection GUI and again enables the player to actuate one of the buttons 220*a*, 220*b*, 220*c*, 220*d* to indicate which of the video poker games the player desires to play. The gaming system receives an actuation of the button 220*d* associated with Double Double Bonus Poker.

Figure 2N:
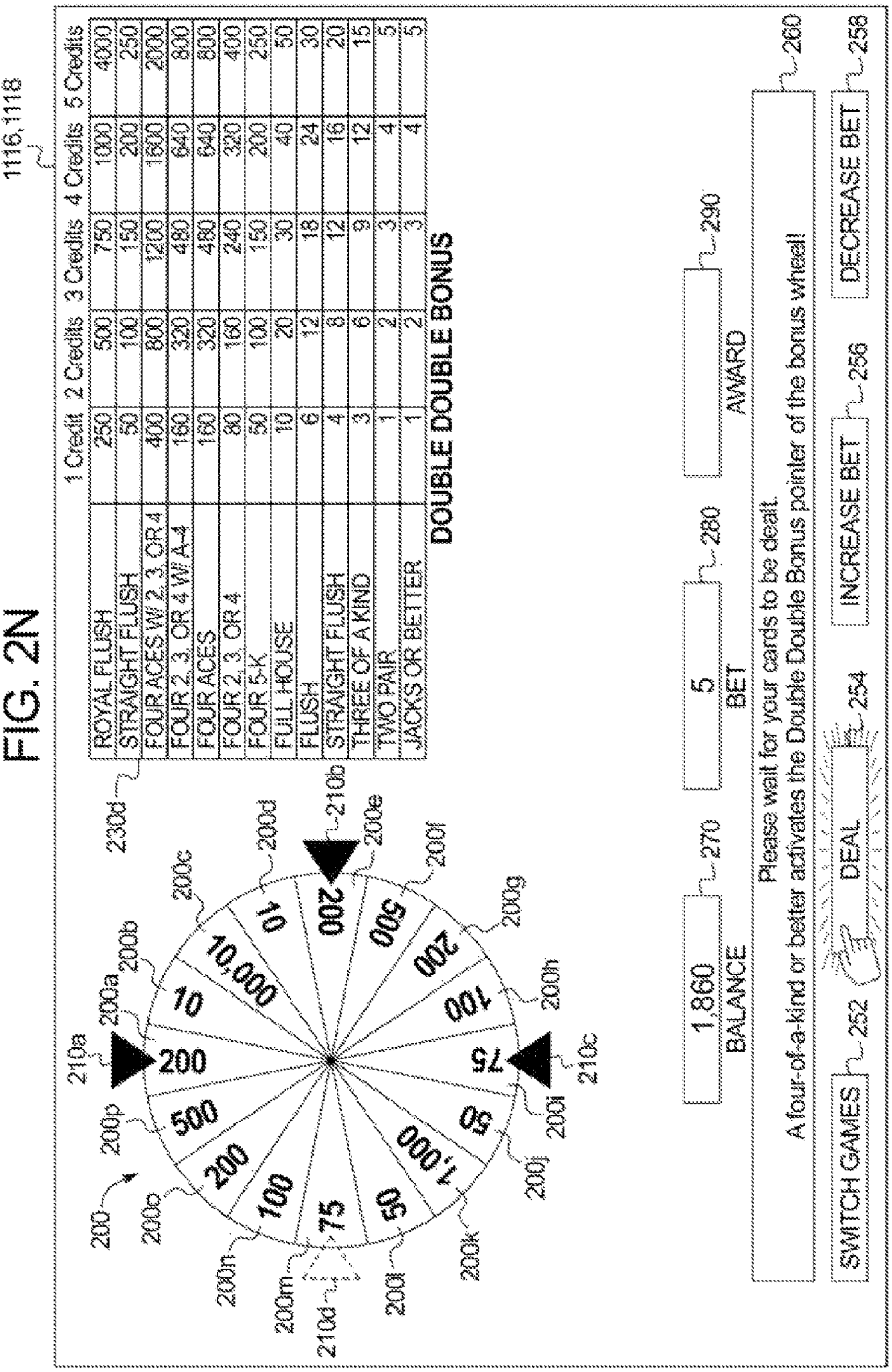

As shown in FIG. 2N, after receiving the actuation of the button 220*d* associated with Double Double Bonus Poker, the gaming system displays a GUI associated with Double Double Bonus Poker that enables the player to play Double Double Bonus Poker. More specifically, the gaming system displays: (a) the bonus wheel 200; (b) a Double Double Bonus Poker payable 230*d*, which lists each winning poker hand and its associated award for wagers of 1 credit, 2 credits, 3 credits, 4 credits, and 5 credits; (c) the message box 260 (described above); (d) a plurality of meters including: (i) the credit meter 270 (described above), (ii) the bet or wager meter 280 (described above), and (iii) the award meter 290 (described above); and (e) a plurality of virtual selectable buttons that the gaming system enables the player to actuate, including (i) the switch games button 252 (described above); (ii) the deal button 254 (described above); (iii) the increase bet button 256 (described above); and (iv) the decrease bet button 258 (described above).

The gaming system receives a wager of 5 credits from the player (as shown in the bet meter 280) and receives an actuation of the deal button 254. The gaming system displays the following message in the message box 260: "PLEASE WAIT FOR YOUR CARDS TO BE DEALT. A FOUR-OF-A-KIND OR BETTER ACTIVATES THE DOUBLE DOUBLE BONUS POINTER OF THE BONUS WHEEL!"

Figure 2O:
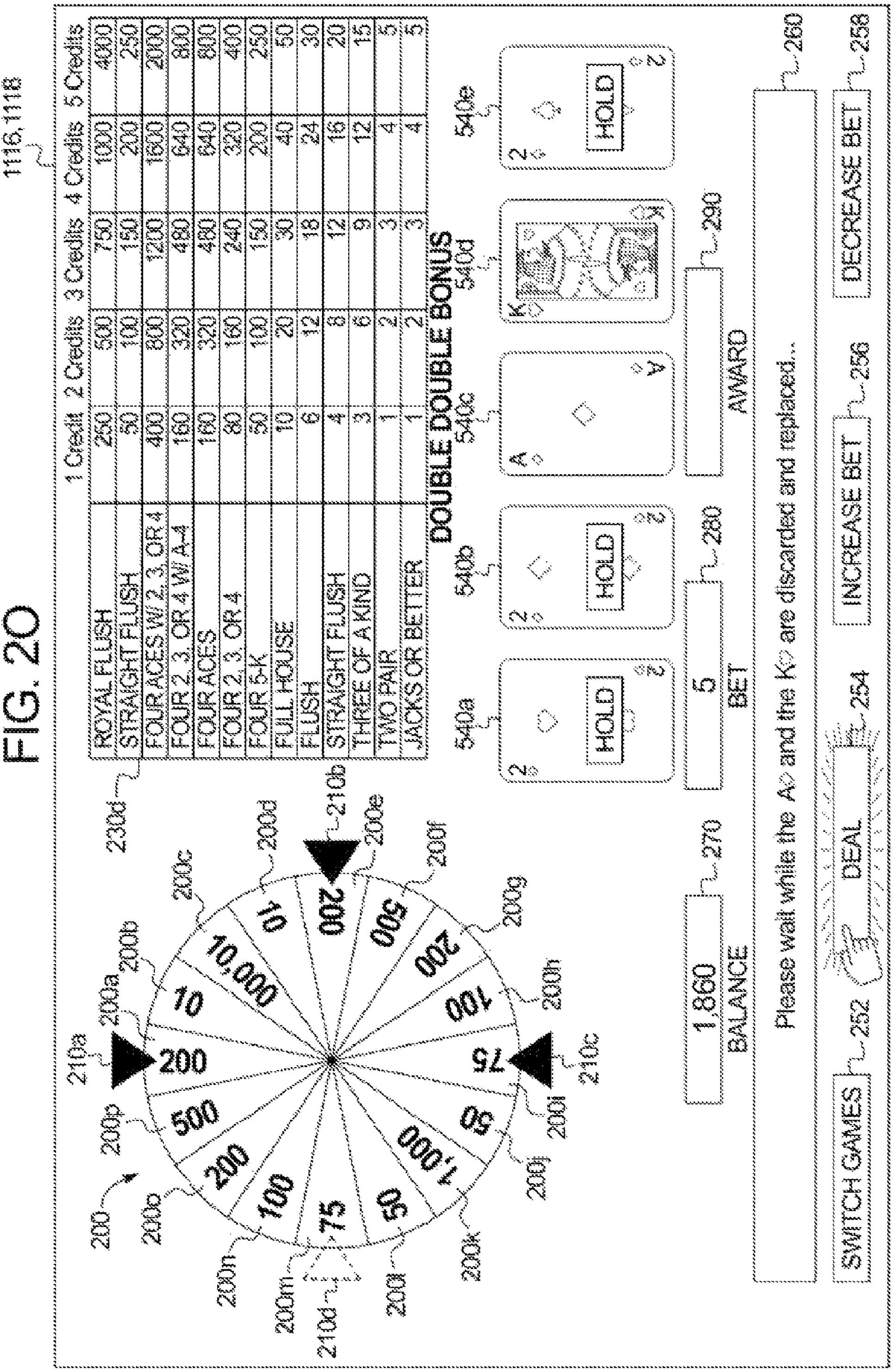

As illustrated in FIG. 2O the gaming system determines and displays an initial player hand of cards including 2♥ 540*a*, 2♦ 540*b*, A♦ 540*c*, K♥ 540*d*, and 2♠ 540*e*. The gaming system enables the player to select up to five of the cards of the initial player hand to hold and, in this example embodiment receives an indication to hold the 2♥ 540*a*, the 2♦ 540*b*, and the 2♠ 540*e*. The gaming system receives an actuation of the deal button 254. The gaming system displays the following message in the message box 260: "PLEASE WAIT WHILE THE A♦ AND THE K♥ ARE DISCARDED AND REPLACED . . . . "

Figure 2P:
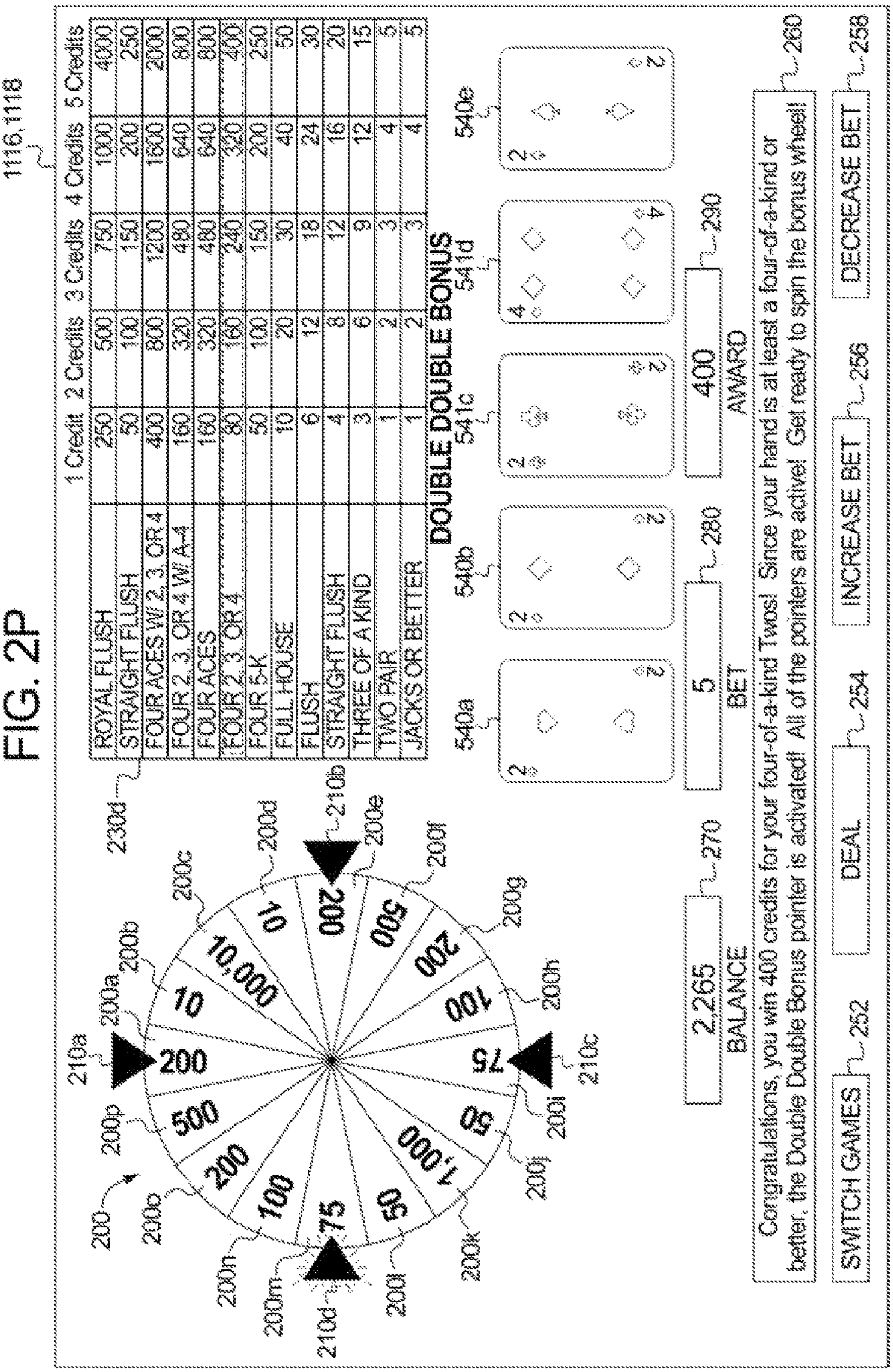

As illustrated in FIG. 2P, the gaming system discards the A♦ 540*c* and the K♥ 540*d* from the initial player hand, selects replacement cards 2♣ 541*c* and 8♦ 541*d*, and adds the replacement cards 2♣ 541*c* and 8♦ 541*d* to the initial player hand to form a final player hand. That is, the gaming system replaces the discarded cards A♦ 540*c* and K♥ 541*d* with the replacement cards 2♣ 541*c* and 8♦ 541*d* to form the final player hand. The gaming system evaluates the final player hand 2♥ 540*a*, 2♦ 540*b*, 2♣ 541*c*, 8♦ 541*d*, and 2 ♠ 540*e*, which is a four-of-a-kind of Twos, against the Double Double Bonus Poker payable 230*d* and determines an award of 400 credits associated with the final player hand. The gaming system displays the 400 credit award in the award meter 290 and updates the player's credit balance to reflect the 400 credit award.

Since the final player hand is a four-of-a-kind or better, the gaming system determines that the award indicator activation event associated with Double Double Bonus Poker occurred in association with this play of Double Double Bonus Poker. Since, at this point, the award indicator 210*d* associated with Double Double Bonus Poker is not active, the gaming system activates the award indicator 210*d*. In this example embodiment, the gaming system displays an activation of the award indicator 210*d*. Since the other award indicators are all active (i.e., since all of the award indicators are active at this point), the gaming system determines that the award determination event occurred, and determines to provide a spin of the bonus wheel. The gaming system displays the following message in the message box 260: "CONGRATULATIONS, YOU WIN 400 CREDITS FOR YOUR FOUR-OF-A-KIND TWOS! SINCE YOUR HAND IS A FOUR-OF-A-KIND OR BETTER, THE DOUBLE DOUBLE BONUS POINTER IS ACTIVATED! ALL OF THE POINTERS ARE ACTIVE GET READY TO SPIN THE BONUS WHEEL!"

Figure 2Q:
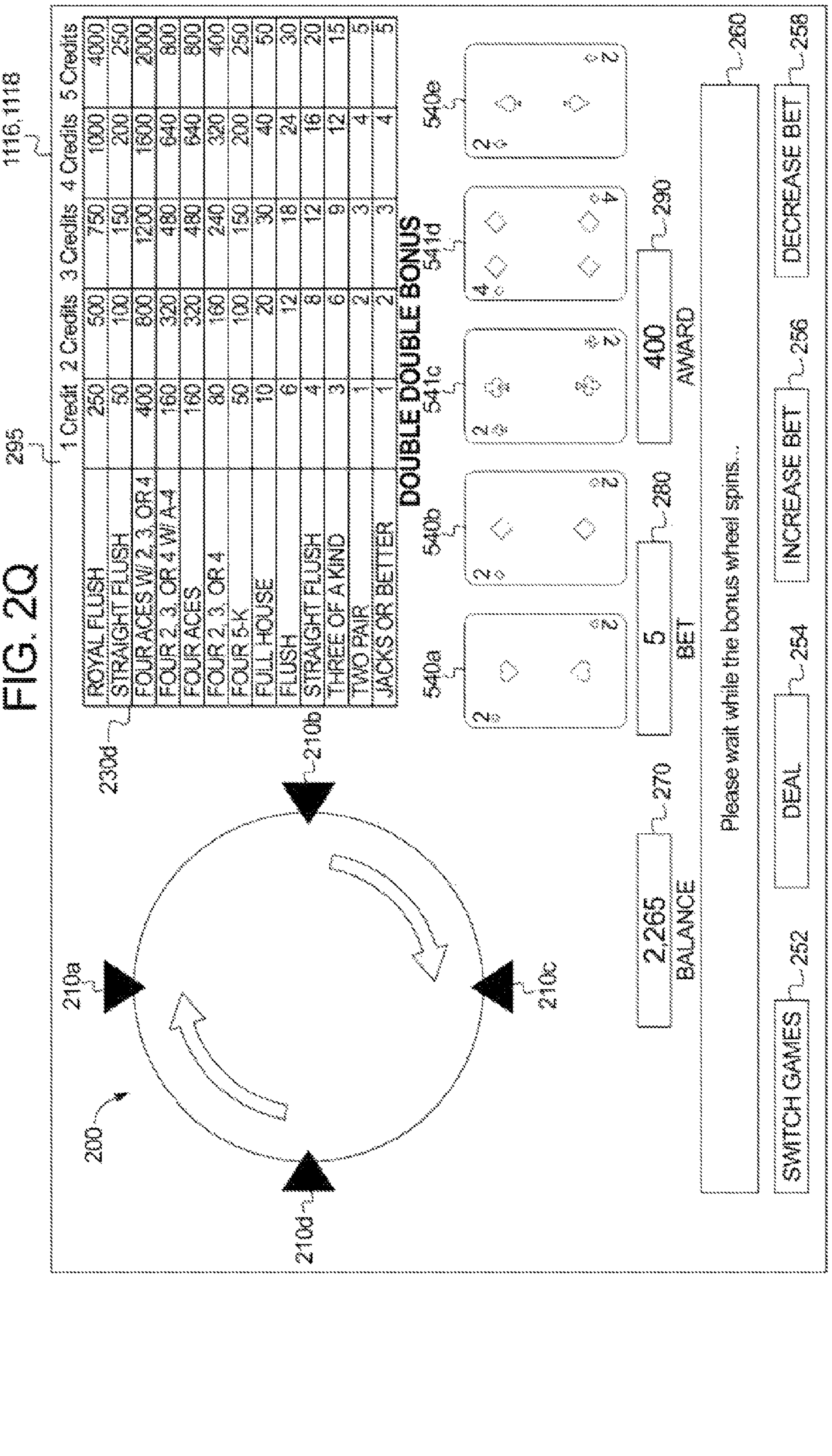

As shown in FIG. 2Q, upon an occurrence of the award determination event in this example embodiment, the gaming system displays a pop-up window 295 in which the gaming system displays the bonus wheel 200 and the award indicators 210*a*, 210*b*, 210*c*, and 210*d*, which are all active. The gaming system displays the bonus wheel 200 spinning relative to the award indicators 210*a*, 210*b*, 210*c*, and 210*d*, and displays the following message in the message box 260: "PLEASE WAIT WHILE THE BONUS WHEEL SPINS . . . . "

Figure 2R:
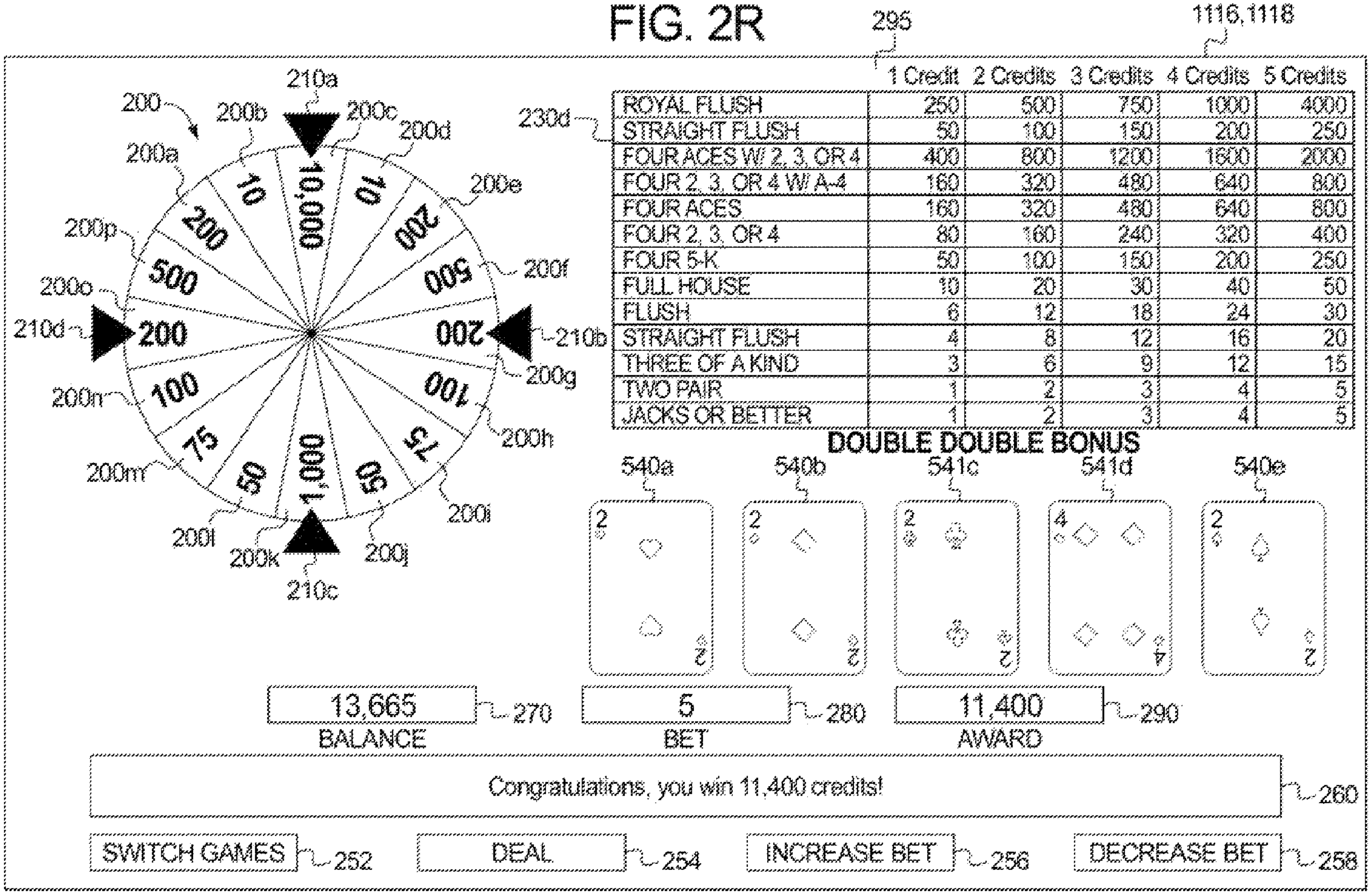

As shown in FIG. 2R, the gaming system stops the bonus wheel 200 such that: (a) the award indicator 210*a* indicates the section 200*c*, which displays the award symbol associated with the 10,000 credit award; (b) the award indicator 210*b* indicates the section 200*g*, which displays the award symbol associated with the 200 credit award; (c) the award indicator 210*c* indicates the section 200*k*, which displays the award symbol associated with the 1,000 credit award; and (d) the award indicator 210*d* indicates the section 200*o*, which displays the award symbol associated with the 200 credit award. The gaming system provides the player the awards associated with the award symbols displayed by the indicated selections for a total award of 11,400 credits. The gaming system displays the following message in the message box 260: "CONGRATULATIONS, YOU WIN 11,400 CREDITS!"

It should be appreciated that the player's gaming session may include any suitable period, such as a period of time or a quantity of plays of a game, that starts and ends upon the occurrence of any suitable events. In one embodiment, the gaming system initiates the player's gaming session upon receiving a deposit of value from the player (i.e., when the player establishes a credit balance on the gaming system) and ends the player's gaming session when the player's credit balance reaches 0 credits. In another embodiment, the gaming system initiates the player's gaming session upon detecting that a player tracking card of the player was inserted into the gaming system and ends the player's gaming upon detecting that the player tracking card has been removed from the gaming system. In another embodiment, the gaming system initiates the player's gaming session upon receiving a deposit of value from the player and ends the player's gaming session if there is no activity for a designated period of time. In another embodiment, the gaming system initiates the player's gaming session upon receiving a deposit of value from the player and ends the player's gaming session if there is no activity for a designated period of time and the player's credit balance is less than a designated number of credits (such as a minimum bet amount).

In various embodiments, the award indicator activation events are determined and associated with the different games such that a probability of occurrence of each award indicator activation event is the same or substantially the same (e.g., within a designated range of probabilities) from game to game. Put differently, the probability of occurrence of the award indicator activation event associated with a particular one of the different games is the same as or substantially the same as the probability of occurrence of the award indicator activation event associated with each of the other games. Thus, in such embodiments, a player is equally (or substantially equally) likely to cause an award indicator activation to occur regardless of the game the player is playing.

In other embodiments, the award indicator activation events are determined and associated with the different games such that a probability of occurrence of at least two award indicator activation events are different. Put differently, the probability of occurrence of the award indicator activation event associated with a particular one of the different games is different than (e.g. higher than or lower than) the probability of occurrence of the award indicator activation event associated with at least one of the other games. Thus, in such embodiments, the likelihood of a player causing an award indicator activation to occur may differ from game to game.

In certain embodiments, the gaming system indicates the game with which each activatable award indicator is associated. For instance, in one example embodiment in which the gaming system enables a player to play Jacks or Better Poker, Deuces Wild Poker, Double Bonus Poker and Double Double Bonus Poker and includes a different activatable award indicator associated with each of these video poker games, the gaming system displays text associated with each activatable award indicator indicating with which of the video poker games that activatable award in is associated. This enables the player to quickly and easily determine which of the activatable award indicators are active and which are not active.

In various embodiments, different denomination gaming systems associated with different sets of activatable award indicators. In other words, in these embodiments, when the gaming system activates one or more award indicators when the player is playing a gaming system at a first denomination, the gaming system does not activate any corresponding award indicators at different denominations. For instance, in an example embodiment in which the gaming system activates an award indicator associated with Jacks or Better Poker when the player is playing at a $0.25 denomination, the gaming system does not activate the award indicator associated with Jacks or Better Poker at any other denominations (such as $0.01, $0.02, $0.05, $1, and $5).

Similarly, in various embodiments, different wager levels are associated with different sets of award indicators. In other words, in these embodiments, when the gaming system activates one or more award indicators when the player is playing a gaming system at a wager level, the gaming system does not activate any corresponding activatable award indicators at different wager levels. For instance, in an example embodiment in which the gaming system activates an award indicator associated with Jacks or Better Poker when the player wagered 5 credits on a play of Jacks or Better Poker, the gaming system does not activate the award indicator associated with Jacks or Better Poker at any other wager levels (such as 1 credit, 2 credits, 3 credits, and 4 credits.

In certain embodiments, if the gaming system determines that: (a) an award activation event associated with a game occurred, and (b) the award indicator associated with that game is already active, the gaming system provides an additional award to the player. In one example embodiment, the additional award is a modifier, such as a multiplier, that the gaming system employs to modify the award(s) indicated by the award indicators upon the occurrence of the award determination event. Additionally, in this example embodiment, the gaming system increases a value of the modifier for each additional occurrence of the award indicator activation event associated with the game until the occurrence of the award determination event. It should be appreciated that the additional award may be any suitable award such as, but not limited to: (1) monetary credits or currency; (2) non-monetary credits or currency; (3) a modifier such as a multiplier used to modify one or more awards; (4) one or more free plays of a game (such as one or more free spins of a spinning reel type game); (5) one or more plays of one or more bonus games (such as a free spin of an award wheel); (6) one or more lottery based awards (such as one or more lottery or drawing tickets); (7) a wager match for one or more plays of the a wagering game; (8) an increase in an average expected payback percentage of a bonus game and/or an average expected payback percentage of a primary wagering game for one or more plays; (9) one or more camps (such as a free dinner or a free night's stay at a hotel); (10) one or more bonus or promotional credits usable for online play; (11) one or more player tracking points; (12) a multiplier for player tracking points or credits; (13) an increase in a membership or player tracking level; (14) one or more coupons or promotions usable within a gaming establishment and/or outside of the gaming establishment (e.g., a 20% off coupon for use at a retail store or a promotional code providing a deposit match for use in association with an online casino); (15) an access code usable to unlock content on the Internet; (16) a progressive jackpot or other progressive award; (17) a high value product or service (such as a car); (18) a low value product or service (such as a teddy bear); and (19) an increase in the value of one or more of the awards included in the payable for a designated period (such as a designated period time or a designated quantity of plays of the game).

In certain embodiments in which at least two of the games have different average expected payback percentages, the gaming system accounts for the different average expected payback percentages of the different games by associating one or more of the award indicators with an additional award (such as an award of credits or any of the other types of awards described above) or a modifier (such as a multiplier).

In various embodiments, at least two games are associated with a single one of the award indicators. That is, in the embodiments, each of the games is not associated with a different one of a plurality of different award indicators. In these embodiments, if an award indicator is associated with a plurality of games, each of which is associated with an award indicator activation event, the gaming system activates the award indicator when the award indicator activation event associated with any one of the plurality of games occurs. For instance, in an example embodiment in which an award indicator is associated with both Deuces Wild Poker and Double Double Bonus Poker, the gaming system activates the award indicator when either (a) the award indicator activation event associated with Deuces Wild Poker occurs, or (b) the award indicator activation event associated with Double Double Bonus Poker occurs.

It should be appreciated that the award indicator activation events may be any suitable triggering events such as (but not limited to): (a) an outcome of a play of a game being a designated outcome (e.g., the final player and for a play of a video poker game being a particular hand or the outcome of a slot game including a particular symbol combination); (b) an outcome of a play of a game being one of a plurality of designated outcomes (e.g., the final player hand for a play of a video poker game being one of a plurality of particular hands or the outcome of a slot game including one of a plurality of particular symbol combinations) (c) a player having completed a designated quantity of plays of a game or a designated quantity of plays of a plurality of games (e.g., the player having played 1,000 games of video poker); (d) a time elapsed during the player's gaming session reaching a designated amount; (e) coin-in during the player's gaming session reaching a designated amount; (f) the player achieving a designated sequence of outcomes; (g) the player achieving each of a plurality of particular outcomes (e.g., the player achieving each winning poker hand at least once); (h) the player winning a designated amount; and/or (i) the player losing a designated amount.

It should also be appreciated that the award determination event may be any suitable triggering event, such as (but not limited to): (a) all of the award indicators becoming active (as described above with respect to the example embodiment shown in FIGS. 2A to 2R); (b) a designated quantity of the award indicators becoming active; (c) upon player selection (e.g., the gaming system enables the player to actively cause the award determination event to occur whenever a designated quantity of at least one award indicator is active); (d) when the player's credit balance reaches a designated amount (e.g., when the player's credit balance reaches 0 credits); (e) upon receipt of a gaming session termination input (e.g., when the gaming system receives a cash out input or when the gaming system determines that a player tracking card has been removed from the gaming system); and/or (f) an outcome of a play of a game is a designated outcome.

In certain embodiments, upon receiving a gaming session termination input from the player, if at least one award indicator is active, the gaming system enables the player to cause the award determination event to occur. If the player causes the award determination event to occur, for each active award indicator, the gaming system indicates one of the award symbols and provides the award(s) associated with the indicated award symbol(s) to the player. If, on the other hand, the player does not cause the award determination event to occur, the gaming system deactivates the active award indicator(s) and terminates the player's gaming session.

In other embodiments, the gaming system stores or otherwise saves the states of the award indicators upon receiving a gaming session termination input from the player. For instance, in an example embodiment in which the player has identified herself by inserting her player tracking card into the gaming system before playing a particular game at a particular denomination, the gaming system stores data representing the state of award indicator (e.g., whether that award indicator is active or not active), that game, and that denomination in association with the player's player tracking account. Thus, the next time the player identifies herself using her player tracking card while playing that game at that denomination, the gaming system restores the award indicators to their previous states.

In other embodiments, upon receiving a gaming session termination input from the player, the gaming system terminates the player's gaming session without deactivating any active pointers. Thus, in the embodiments, a subsequent player may use the award indicators that were activated by one or more prior players.

In other embodiments, upon receiving a gaming session termination input from the player, the gaming system enables the player to choose to receive a payout equal to or substantially equal to the average expected payout of each of the active award indicators at that particular point in time. For instance, if the gaming system receives the gaming session termination input from the player when two award indicators are active, the gaming system enables the player to choose to receive a payout equal to or substantially equal to the average expected payout of each of the two active award indicators.

In various embodiments, each award symbol has a probability of being indicated by one of the award indicators. In one embodiment, each award symbol has the same probability of being indicated. In another embodiment, at least two of the award symbols have different probabilities of being indicated. In another embodiment, all of the award symbols have different probabilities of being indicated. In certain such embodiments, the probability of being indicated of at least one of the award symbols changes (such as increases or decreases) when the gaming system activates an award indicator. In such embodiments, when the award determination event occurs, the gaming system determines which award symbol(s) to indicate with the indicator(s) based a least in part on the probabilities of being indicated of the award symbols. In one embodiment, the gaming system does so in the manner described in U.S. Pat. No. 7,427,236.

In various embodiments, a single game is associated with a plurality of different activatable award indicators. In one such embodiment, the award indicators associated with the game are associated with different award indicator activation events. For instance, in an example embodiment in which Jacks or Better Poker is associated with a first award indicator and a second award indicator, the gaming system activates the first award indicator when the final player hand is a flush or a full house and activates the second award indicator when the final player hand is a four-of-a-kind or a straight flush. In another such embodiment, both award indicators are associated with an award indicator activation event that, when it occurs, causes the gaming system to activate both award indicators. For instance, continuing with the above-described example embodiment, the gaming system activates both the first and second award indicators when the final player hand is a royal flush.

In another such embodiment, the award indicators associated with the game are associated with the same award indicator activation event. For instance, in an example embodiment in which Jacks or Better Poker is associated with a first award indicator and a second award indicator, the gaming system activates the first award indicator upon a first occurrence of the award indicator activation event and activates the second award indicator upon a second occurrence of the award indicator activation event. It should be appreciated that when a plurality of award indicators associated with a game are associated with the same award indicator activation event, the gaming system may determine which of the award indicators to activate upon the occurrence of the award indicator activation event, in any suitable manner (such as any of those described below).

In certain embodiments, the gaming system enables the player to play only one of the games until the gaming system activates the award indicator associated with that game, at which point the gaming system automatically switches to enabling the player to play another one of the games associated with a non-active award indicator. For instance, in one example embodiment in which the gaming system enables the player to play Jacks or Better Poker, Deuces Wild Poker, and Double Bonus Poker and in which each of those video poker games is associated with a different activatable award indicator, the gaming system: (a) enables the player to play Jacks or Better Poker until the gaming system activates the award indicator associated with Jacks or Better Poker (b) when the gaming system activates the award indicator associated with Jacks or Better Poker, automatically switches to enable the player to play Deuces Wild Poker until the gaming system activates the award indicator associated with Deuces Wild Poker and (c) when the gaming system activates the award indicator associated with Deuces Wild Poker, automatically switches to enable the player to play Double Bonus Poker until the gaming system activates the award indicator associated with Double Bonus Poker.

In various embodiments, upon an occurrence of any suitable increase event (such as the display of a designated award increase outcome for a play of a game), the gaming system increases the value of at least one of the awards associated with the award symbols of the award generator. In one embodiment, one of the award indicator activation events is also an award increase event such that when that award indicator activation event occurs, the gaming system: (a) increases at least one of the awards associated with the award symbols; and (b) if the award indicator associated with that award indicator activation event is not active, activates that award indicator.

Figure 4A:
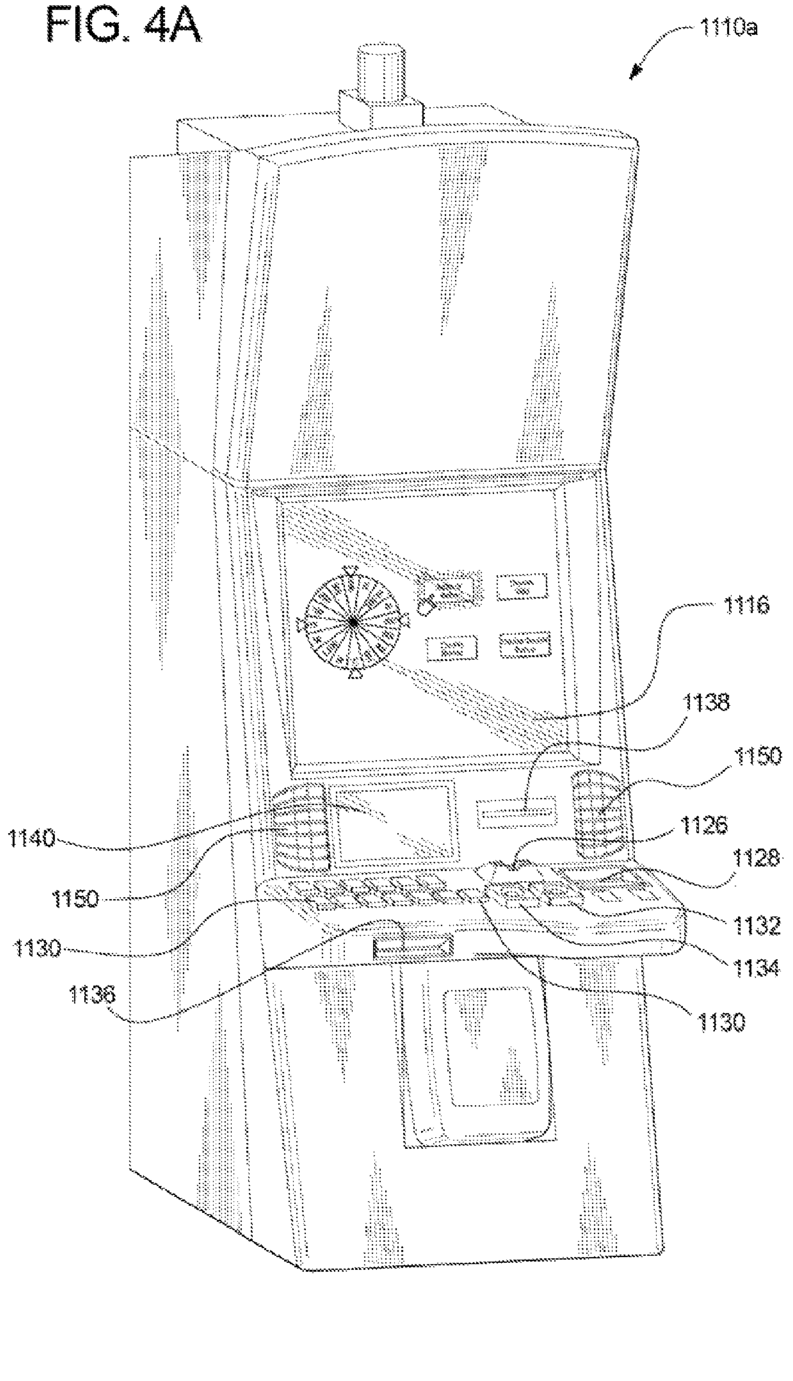
FIGS. 4A and 4B are perspective views of example alternative embodiments of the gaming system of the present disclosure.
Figure 4B:
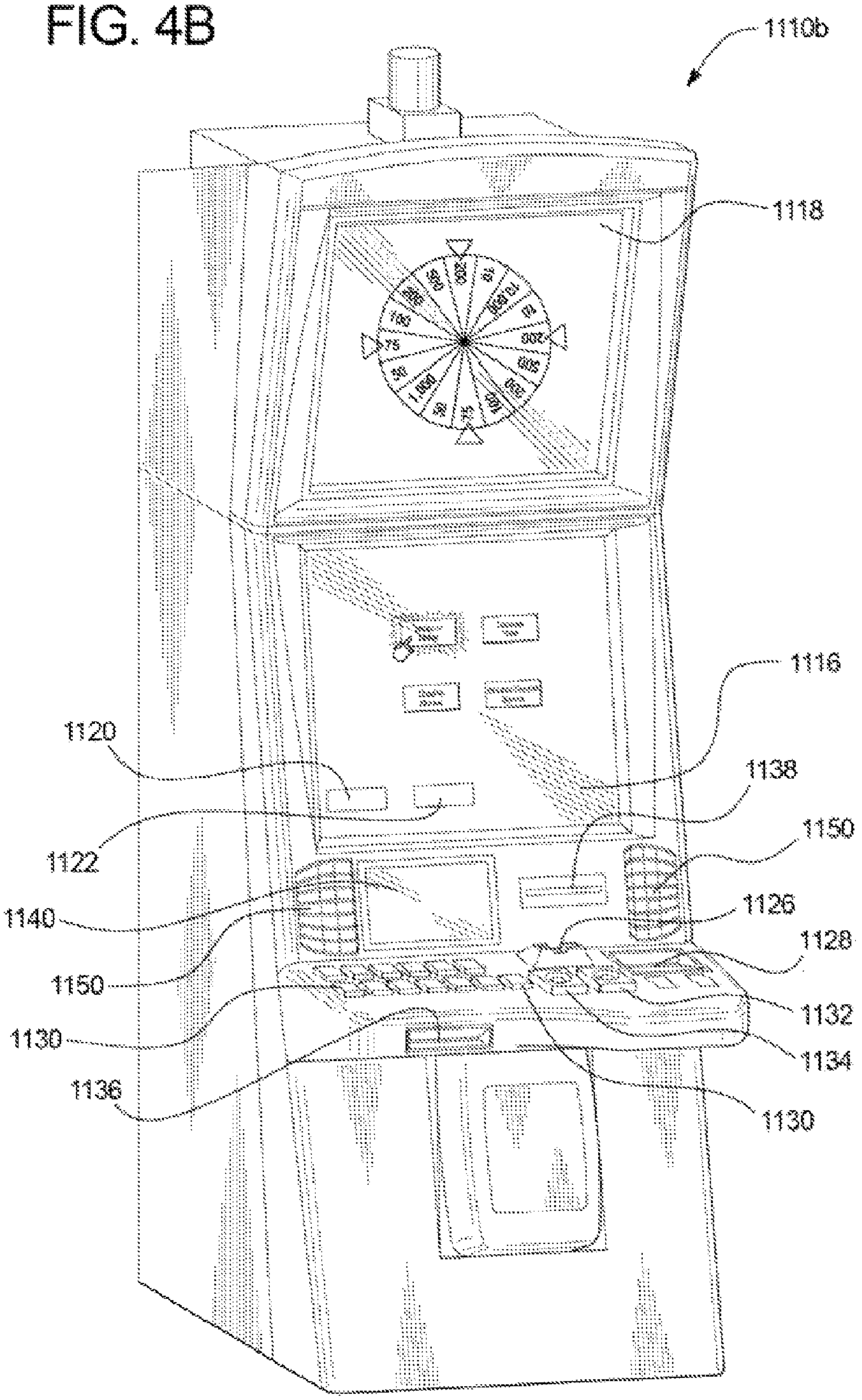

In one embodiment, such as the embodiment shown in FIG. 4B, the gaming system displays the award generator on a secondary display, such as a to box. In another embodiment, the gaming system displays the award generator in a service window or a player tracking window (not shown).

It should be appreciated that;

(a) the plurality of different games;

(b) the award symbols;

(c) the number of award symbols;

(d) the awards associated with the award symbols; the award indicator activation events;

(f) the game with which a particular award indicator activation event is associated;

(g) the award determination event;

(h) the award generator;

(i) the selection of which award symbols to indicate;

(j) the probability of being indicated of the award symbols;

(k) in embodiments in which the award generator is a bonus wheel, the locations of the award indicators relative to the bonus wheel (l) the number of award indicators; and/or (m) any other variables or determinations described herein may be: (1) predetermined; (2) randomly determined (3) randomly determined based on one or more weighted percentages (such as according to a weighted table); (4) determined based on a generated symbol or symbol combination; (5) determined independent of a generated symbol, or symbol combination; (6) determined based on a random determination by a central controller (described below); (7) determined independent of a random determination by the central controller; (8) determined based on a random determination at an EGM configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to those described below.

The present disclosure contemplates a variety of different gaming systems each having one or more of a plurality of different features, attributes, or characteristics. It should be appreciated that a "gaming system" as used herein refers to various configurations of (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controller, or remote hosts; (b) one or more personal gaming devices in combination with one or more central servers central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
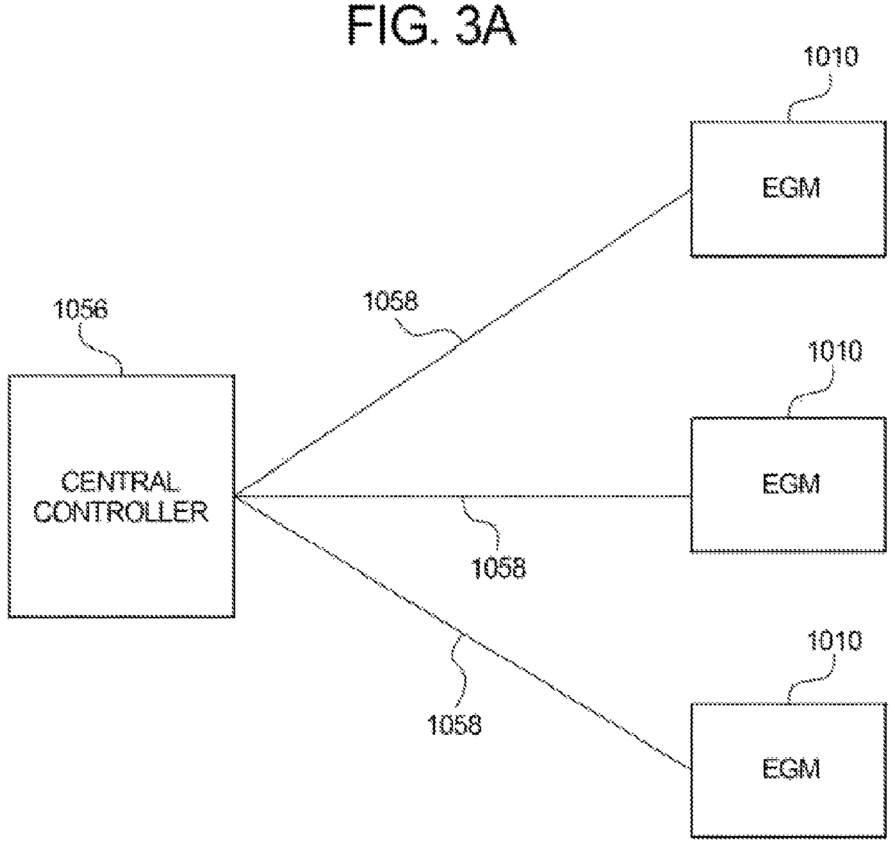
FIG. 3A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote most remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games for other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internal or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking and or other smart card inserted into a card reader (as described below); by validating a unique Mayer identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays the internet browser of the EGM.

It should be appreciated that the central server, central controller, or remote host and the EGM are configured to connect to the data network or remote communications link in any suitable manner, various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications particularly if such communications are encrypted. Higher data transmission speeds may be useful for enhancing the sophistication and response of the display and interaction with players.

EGM Components

Figure 3B:
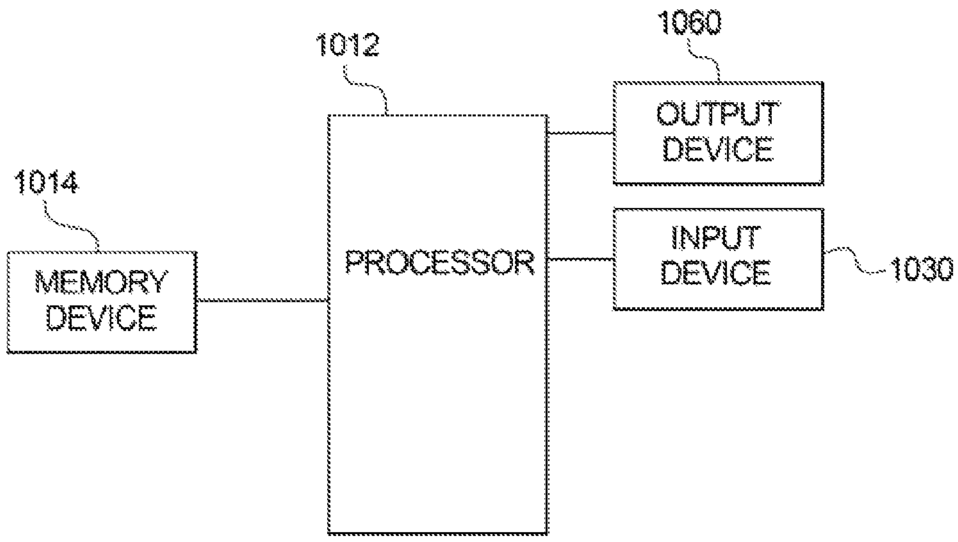
FIG. 3B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or Intranet).

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM an controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1135. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication pods that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509 and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2001/0028201 describe various examples of this type of award determination.

In certain embodiments in which the gaming system includes a central server, central controller, or remote host and an EGM the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes (a) a player database for storing player profiles, player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games, video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or a video form with simulated reels and movement thereof. Each reel displays a plurality of indicia or symbols, such as belts, hearts, fruits, numbers, letters, bars, or other images that typically correspond to a theme associated with the gaming system. In certain such embodiments, the gaming system includes one or more paylines, associated with the reels. In certain embodiments, one or more of the reels are independent reels or unisymbol reels. In such embodiments, each independent reel generates and displays one symbol.

In various embodiments, one or more of the paylines is horizontal vertical, circular, diagonal, angled, or any suitable combination thereof. In other embodiments, each of one of more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication No 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game (s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that at any suitable triggering event or qualifying condition or any suitable combination of a plurality of different triggering events or qualifying conditions may be employed.

In other embodiments, at least one processor of the gaming system randomly determines when to provide one or more plays of one or more secondary games, in one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaining system determines qualification for a secondary game at least partially based on a game triggered or symbol triggered event such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "Secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be paced on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to in one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's and number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing it intended advantages. It is therefore intended that such changes and modifications be covered by the appended claims.

The invention is claimed as follows:

1. A gaming system comprising:

at least one input device;

at least one display device;

at least one processor; and at least one memory device that stores a plurality of instructions which, when executed by the at least one processor, cause the at least one processor to operate with the at least one input device and the at least one display device to, for a gaming session of a player:

(a) display an award generator including a plurality of award symbols, wherein each of the award symbols is associated with one of a plurality of different awards;

(b) enable the player to play any of a plurality of different games, wherein each of the games is associated with: (i) a different one of a plurality of different activatable award indicators, and (ii) one of a plurality of different award indicator activation events;

(c) for each play of each of the games, if the award indicator activation event associated with said game occurs and the award indicator associated with said game is no active, activate the award indicator associated with said game; and (d) upon an occurrence of an award determination event, for each active award indicator, indicate one of the award symbols and provide the award associated with said indicated award symbol to the player.

2. The gaming system of claim 1, wherein each of the award activation events is associated with at least one outcome of the game with which said award activation event is associated.

3. The gaming system of claim 1, wherein the award determination event occurs when a designated quantity of the award indicators are activated.

4. The gaming system of claim 1, wherein each of the award symbols has a probability of being indicated, and the plurality of instructions, when executed by the at least one processor, cause the at least one processor to, for each play of each of the games, if the award indicator activation event associated with said game occurs and the award indicator associated with said game is not active, increase the probability of being indicated of at least one of the award symbols.

5. The gaming system of claim 1, wherein the award generator is a wheel including a plurality of sections, each of the sections being associated with one of the award symbols.

6. The gaming system of claim 5, wherein the plurality of instructions, when executed by the at least one processor, cause the at least one processor to operate with the at least one display device to, upon the occurrence of the award determination event, for each active award indicator, indicate one of the award symbols by spinning and stopping the wheel such that each active award indicator indicates one of the sections of the wheel.

7. A method of operating a gaming system, said method comprising:

for a gaming session of a player:

(a) causing at least one processor to execute a plurality of instructions stored in at least one memory device to operate with at least one display device to display an award generator including a plurality of award symbols, wherein each of the award symbols is associated with one of a plurality of different awards;

(b) enabling the player to play any of a plurality of different games, wherein each of the games is associated with: (i) a different one of a plurality of different activatable award indicators, and (ii) one of a plurality of different award indicator activation events;

(c) for each play of each of the games, if the award indicator activation event associated with said game occurs and the award indicator associated with said game is not active, causing the at least one processor to execute the plurality of instructions to activate the award indicator associated with said game; and (d) upon an occurrence of an award determination event, for each active award indicator, causing the at least one processor to execute the plurality of instructions to operate with the at least one display device to indicate one of the award symbols and provide the award associated with said indicated award symbol to the player.

8. The method of claim 7, wherein each of the award activation events is associated with at least one outcome of the game with which said award activation event is associated.

9. The method of claim 1, wherein the award determination event occurs when a designated quantity of the award indicators are activated.

10. The method of claim 7, wherein each of the award symbols has a probability of being indicated, and which includes causing the at least one processor to execute the plurality of instructions to, for each play of each of the games, if the award indicator activation event associated with said game occurs and the award indicator associated with said game is not active, increase the probability of being indicated of at least one of the award symbols.

11. The method of claim 7, wherein the award generator is a wheel including a plurality of sections, each of the sections being associated with one of the award symbols.

12. The method of claim 11, which includes causing the at least one processor to execute the plurality of instructions to operate with the at least one display device to, upon the occurrence of the award determination event, for each active award indicator, indicate one of the award symbols by spinning and stooping the wheel such that each active award indicator indicates one of the sections of the wheel.

13. The method of claim 7, which is provided through a data network.

14. The method of claim 13, wherein the data network is an internet.

15. A non-transitory computer readable medium storing a plurality of instructions which, when executed by at least one processor, cause the at least one processor to:

for a gaming session of a player:

(a) cause at least one display device to display an award generator including a plurality of award symbols, wherein each of the award symbols is associated with one of a plurality of different awards;

(b) enable the player to play any of a plurality of different games, wherein each of the games is associated with: (i) a different one of a plurality of different activatable award indicators, and (ii) one of a plurality of different award indicator activation events;

(c) for each play of each of the games, if the award indicator activation event associated with said game occurs and the award indicator associated with said game is not active, activate the award indicator associated with said game; and (d) upon an occurrence of an award determination event, for each active award indicator, cause the at least one display device to indicate one of the award symbols and provide the award associated with said indicated award symbol to the player.

16. The non-transitory computer readable medium of claim 15, wherein each of the award activation events is associated with at least one outcome of the game with which said award activation event is associated.

17. The non-transitory computer readable medium of claim 15, wherein the award determination event occurs when a designated quantity of the award indicators are activated.

18. The non-transitory computer readable medium of claim 15, wherein each of the award symbols has a probability of being indicated, and the plurality of instructions, when executed by the at least one processor, cause the at least one processor to, for each play of each of the games, if the award indicator activation event associated with said game occurs and the award indicator associated with said game is not active, increase the probability of being indicated of at least one of the award symbols.

19. The non-transitory computer readable medium of claim 15, wherein the award generator is a wheel including a plurality of sections, each of the sections being associated with one of the award symbols.

20. The non-transitory computer readable medium of claim 19, wherein the plurality of instructions, when executed by the at least one processor, cause the at least one processor to, upon the occurrence of the award determination event, for each active award indicator, cause the at least one display device to indicate one of the award symbols by spinning and stopping the wheel such that each active award indicator indicates one of the sections of the wheel.

* * * * *